US010460458B1

(12) United States Patent
Vakil et al.

(10) Patent No.: US 10,460,458 B1
(45) Date of Patent: Oct. 29, 2019

(54) METHOD FOR REGISTRATION OF PARTIALLY-OVERLAPPED AERIAL IMAGERY USING A REDUCED SEARCH SPACE METHODOLOGY WITH HYBRID SIMILARITY MEASURES

(71) Applicant: Government of the United States, as Represented by the Secretary of the Air Force, Wright-Patterson AFB, OH (US)

(72) Inventors: Mohammad I. Vakil, Beavercreek, OH (US); John Malas, Kettering, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 70 days.

(21) Appl. No.: 15/704,300

(22) Filed: Sep. 14, 2017

(51) Int. Cl.
| | | |
|---|---|---|
| *G06T 7/33* | (2017.01) | |
| *G06T 3/00* | (2006.01) | |
| *G06T 7/00* | (2017.01) | |
| *G06T 5/00* | (2006.01) | |

(52) U.S. Cl.
CPC ............ *G06T 7/337* (2017.01); *G06T 3/0068* (2013.01); *G06T 5/002* (2013.01); *G06T 7/0002* (2013.01)

(58) Field of Classification Search
CPC .............................. G06T 7/337; G06T 3/0068
See application file for complete search history.

(56) References Cited

U.S. PATENT DOCUMENTS

| | | | | | |
|---|---|---|---|---|---|
| 5,425,108 | A | * | 6/1995 | Hwang | G06K 7/14 382/105 |
| 5,568,384 | A | * | 10/1996 | Robb | G06K 9/32 382/132 |
| 5,689,425 | A | * | 11/1997 | Sainio | B41F 33/0036 101/181 |
| 6,009,212 | A | * | 12/1999 | Miller | G06K 9/32 382/131 |
| 6,011,558 | A | * | 1/2000 | Hsieh | G06T 11/00 345/421 |

(Continued)

OTHER PUBLICATIONS

Vakil, M., Guided Execution of Hybrid Similarity-Measures for Registration of Partially Overlapped Aerial Imagery, IEEE, 2014.

*Primary Examiner* — Chan S Park
*Assistant Examiner* — Mai H Tran
(74) *Attorney, Agent, or Firm* — AFMCLO/JAZ; Timothy M. Barlow

(57) ABSTRACT

A method for registration of partially-overlapped images, comprises (a) performing noise reduction and feature extraction in a reference image and an unregistered image; (b) determining a template size using a phase transition methodology for a sufficiently-sampled finite data set; (c) identifying a template region in the reference image; (d) performing a wide angle estimation of the reference image and the unregistered image; (e) performing orientation and translation of the reference image and the unregistered image; (f) performing a search space reduction of the reference image and the unregistered image; (g) performing a coarse angle estimation of the reference image and the unregistered image; (h) performing orientation of the reference image and the unregistered image of the coarse angle estimation; and (i) performing a fine angle estimation and registration of the reference image and the unregistered image.

7 Claims, 44 Drawing Sheets

Registered Image using Proposed Method 1

(56) References Cited

U.S. PATENT DOCUMENTS

| | | | |
|---|---|---|---|
| 6,714,680 B1* | 3/2004 | Sasada | G06T 7/32 |
| | | | 382/216 |
| 6,804,621 B1* | 10/2004 | Pedanckar | E01B 37/00 |
| | | | 702/85 |
| 7,184,991 B1* | 2/2007 | Wentland | G01V 11/00 |
| | | | 706/45 |
| 7,796,801 B2* | 9/2010 | Kitamura | G06K 9/00 |
| | | | 348/125 |
| 9,053,541 B2* | 6/2015 | Piper | G06T 7/33 |
| 9,135,706 B2* | 9/2015 | Zagorchev | A61B 6/5235 |
| 10,074,031 B2* | 9/2018 | Krenzer | G06K 9/00335 |
| 2001/0036302 A1* | 11/2001 | Miller | G06T 3/0068 |
| | | | 382/128 |
| 2002/0154819 A1* | 10/2002 | Campbell | G06K 9/6211 |
| | | | 382/209 |
| 2003/0086616 A1* | 5/2003 | Oh | G03F 9/7076 |
| | | | 382/209 |
| 2003/0126448 A1* | 7/2003 | Russo | G06K 9/00026 |
| | | | 713/186 |
| 2016/0342677 A1* | 11/2016 | Nuchia | G06F 16/285 |

* cited by examiner

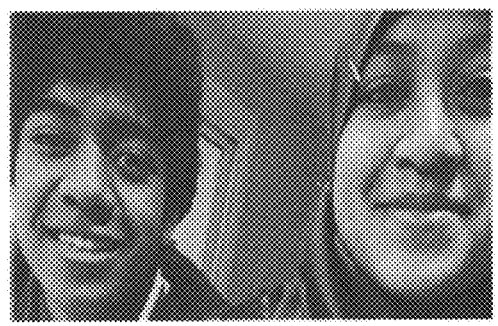
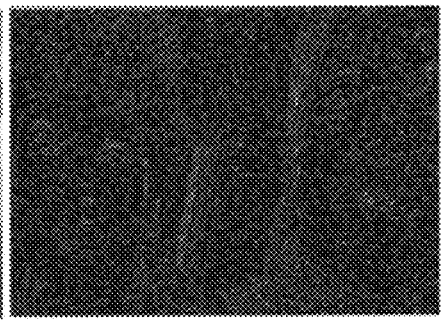
FIG. 1F  FIG. 1G
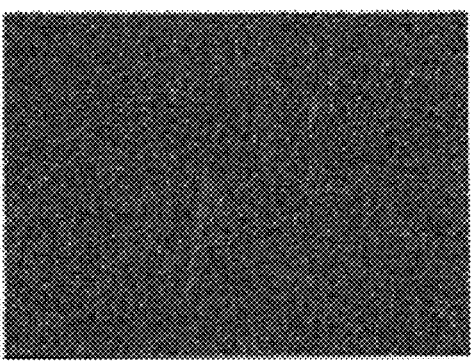
FIG. 1H  FIG. 1I

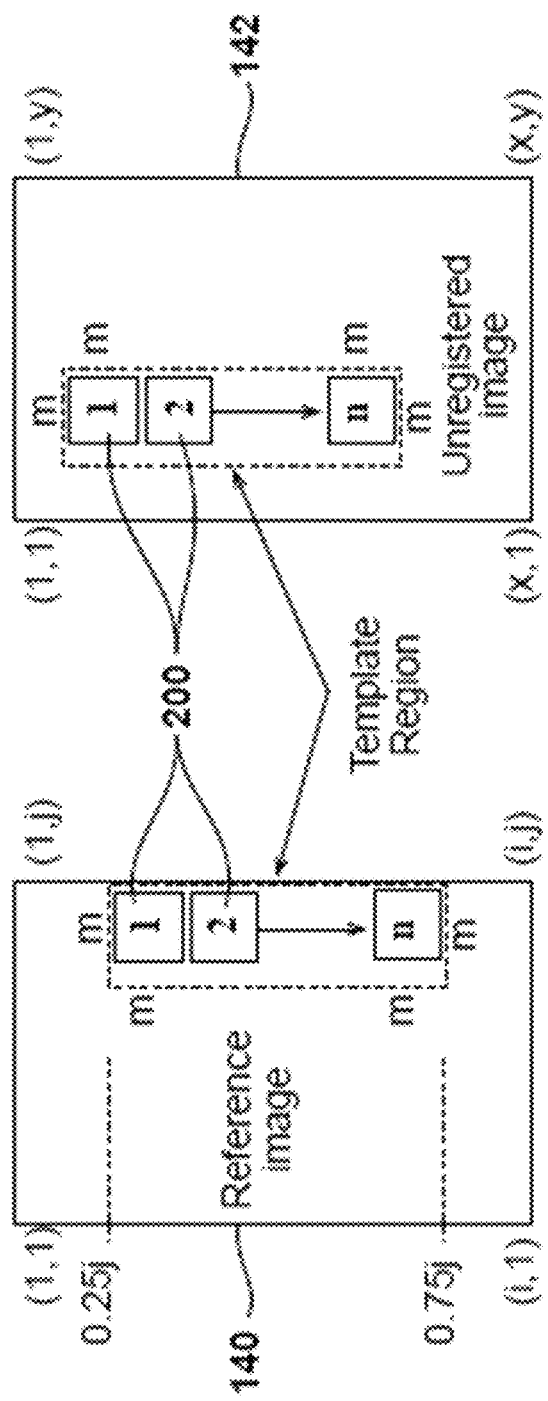

| Window Number | Sub Image Template Size | Window Number | Sub Image Template Size |
|---|---|---|---|
| 1 | 11x11 | 8 | 39x39 |
| 2 | 15x15 | 9 | 43x43 |
| 3 | 19x19 | 10 | 47x47 |
| 4 | 23x23 | 11 | 51x51 |
| 5 | 27x27 | 12 | 55x55 |
| 6 | 31x31 | 13 | 59x59 |
| 7 | 35x35 | 14 | 63x63 |

FIG. 5E

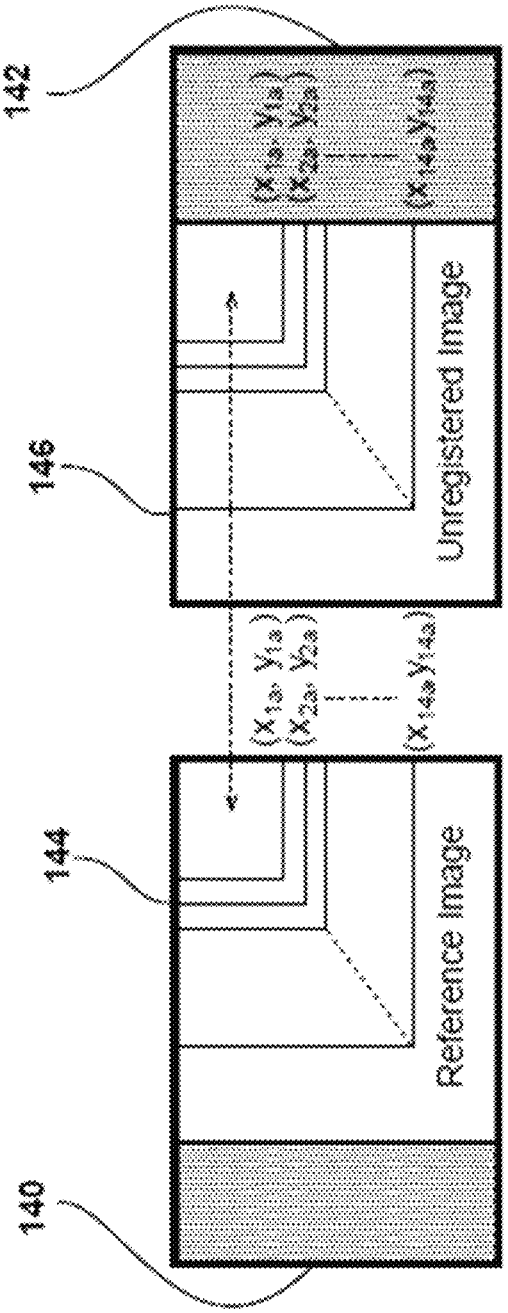

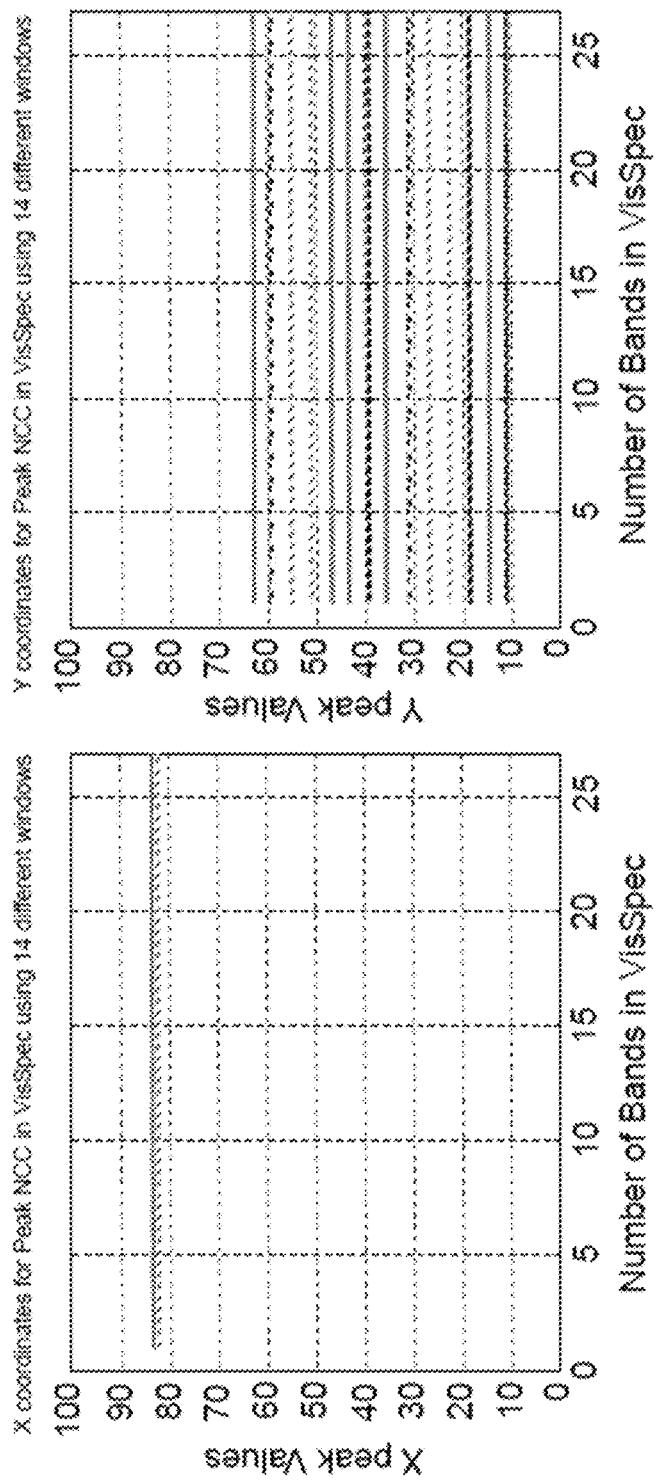

Matched Template Coordinates (x, y) for peak NCC coefficient values in the Near Infrared spectrum Atmospheric transmittance in visible through SWIR where region "a" shows the atmospheric absorption band at the start of shortwave spectrum, and region "b" showing the same in the middle of the shortwave infrared NCC values as a function of sub-scene template size in the NIR spectrum which contained 70 spectral bands) bands 1-14, b) bands 15-28, c) bands 29-42, d) bands 43-56, and e) bands 57-70

NCC values generated as a function of image orientation for fine angle rotation. In this case there are two peaks produced by NCC and convexity of solution no longer produces a unique angle of rotation.

Reference Image (L) and Unregistered Image (R) with negative rotation

Reference image using Proposed Method 1

Reference Image (L) and Unregistered Image (R) with positive rotation

Registered Image using Proposed Method 1

| Algorithmic Module | Processing Time (ms) | |
|---|---|---|
| | Proposed Method | Traditional NCC Algorithm |
| Filtering and Feature Extraction | 719.366 | 719.366 |
| Angle Estimation and Search Space Reduction | 5,512.7 | 13,142 |
| Fine Angle Estimation and Registration | 9,954.6 | 87,899 |
| Total Processing Time | 16,186.7 | 101,760 |

FIG. 25B Experimental results obtained for Processing Time for Image Set 1

| Algorithmic Module | Processing Time (ms) | |
|---|---|---|
| | Proposed Method | Traditional NCC Algorithm |
| Filtering and Feature Extraction | 851.198 | 851.198 |
| Angle Estimation and Search Space Reduction | 6,125.688 | 11,299 |
| Fine Angle Estimation and Registration | 8,147.1 | 75,793.961 |
| Total Processing Time | 15,124.1 | 87,946 |

FIG. 25C Processing Time for Image Set 2

(L) Reference Image (R) Unregistered Image

Registered Image Set 1 (441x400 pixels)

(L) Reference Image (R) Unregistered Image

Registered Image Set 2 (426x364 pixels)

| Algorithmic Module | Number of Operations (*10^8) | |
|---|---|---|
| | Proposed Method | Traditional NCC Algorithm |
| Filtering and Feature Extraction | 8.036 | 8.036 |
| Angle Estimation and Search Space Reduction | 0.4128 | 5.0577 |
| Fine Angle Estimation and Registration | 1.1205 | 13.728 |
| Total Number of Operations | 9.5694 | 26.822 |

FIG. 29B Number of Operations for Image Set 1

| Algorithmic Module | Number of Operations (*10^8) | |
|---|---|---|
| | Proposed Method | Traditional NCC Algorithm |
| Filtering and Feature Extraction | 7.0641 | 7.0641 |
| Angle Estimation and Search Space Reduction | 0.393 | 4.446 |
| Fine Angle Estimation and Registration | 1.0668 | 12.068 |
| Total Number of Operations | 8.5239 | 23.578 |

FIG. 29C Number of Operations for Image Set 2

FIG. 30A
FIG. 30B
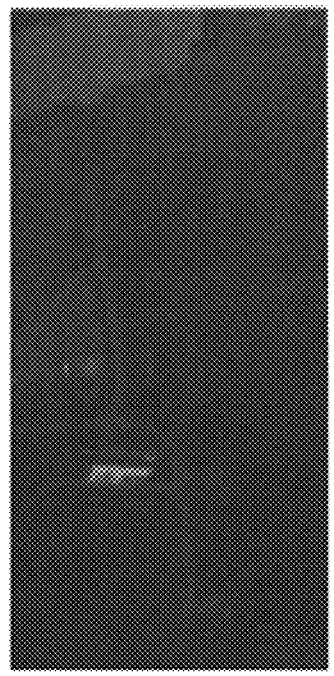
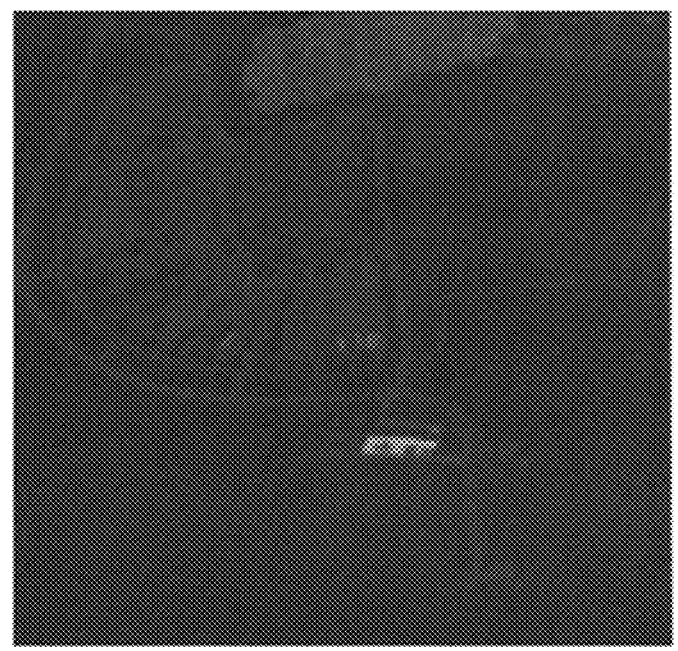
FIG. 30C
Visible Spectrum Registration: (a) Reference Image; (b) Unregistered Image; and (c) Registered Image FIG. 31A
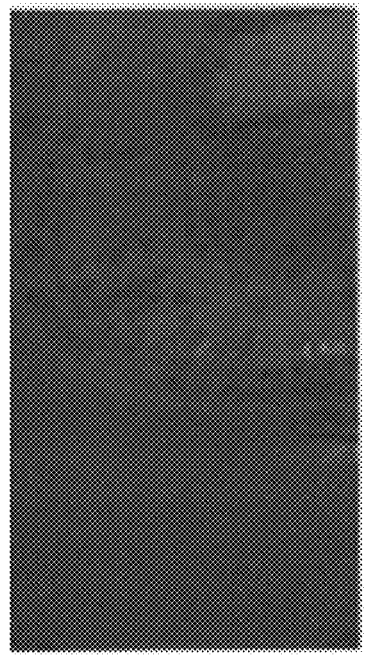
FIG. 31B
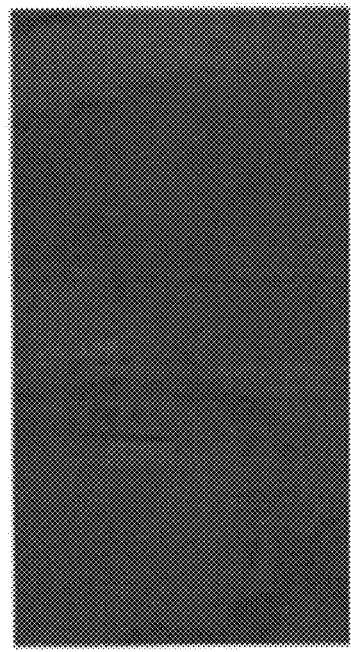
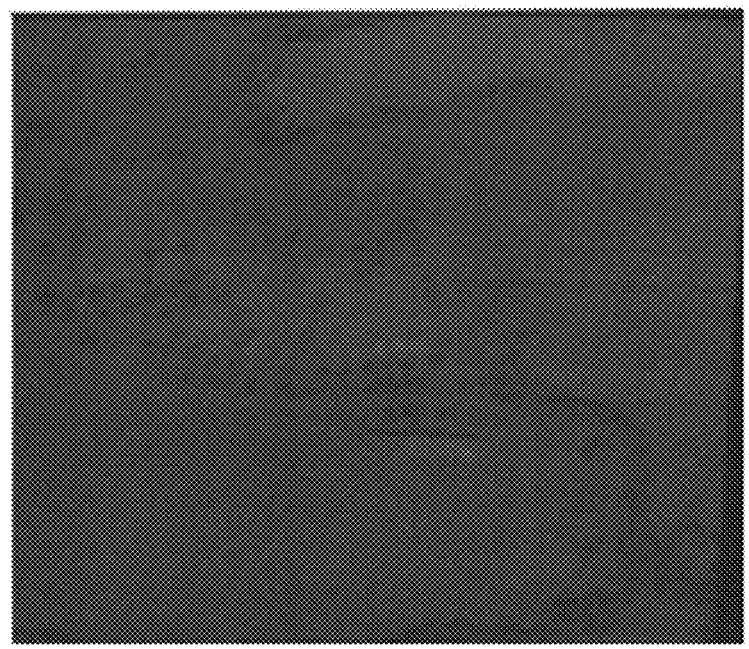
FIG. 31C
Short Wave InfraRed (SWIR) registration: (a) Reference image; (b) Unregistered Image; and (c) Registered Images Registration of a visible spectrum reference image with an SWIR unregistered image

METHOD FOR REGISTRATION OF PARTIALLY-OVERLAPPED AERIAL IMAGERY USING A REDUCED SEARCH SPACE METHODOLOGY WITH HYBRID SIMILARITY MEASURES

RIGHTS OF THE GOVERNMENT

The invention described herein may be manufactured and used by or for the Government of the United States for all governmental purposes without the payment of any royalty.

Pursuant to 37 C.F.R. § 1.78(a)(4), this application claims the benefit of and priority to prior filed Provisional Application Ser. Nos. 62/431,865, filed 9 Dec. 2016; 62/431,876, filed 9 Dec. 2016; and 62/431,877, filed 9 Dec. 2016, which are expressly incorporated herein by reference.

FIELD OF THE INVENTION

The present invention relates generally to the registration of partially-overlapped imagery and, more particularly, to a method for the registration of partially-overlapped aerial imagery using a reduced search space methodology with hybrid similarity measures.

BACKGROUND OF THE INVENTION

Wide area surveillance and reconnaissance in many DoD (Department of Defense) and homeland security applications generally entails an airborne platform providing a desired view of the area of interest. Known image processing methods require multiple CPUs to calculate the transformation for image registration, requires special hardware, e.g. GPU, requires manual identification of major features or landmarks, require active sensors, do not consider atmospheric conditions, e.g. transmittance, reflectance, scene dynamics. The surveillance needs of large critical infrastructures and key resources that may span for miles may demand a field of view that exceeds that provided by a single airborne sensor. Image registration of aerial imagery can increase the field of view while providing a panoramic view. This increases the field of view without any modification to the optics, focal plane array, and associated hardware. This invention presents a multi-stage image registration technique utilizing hybrid similarity measures for partially overlapped aerial imagery, in the presence of sensor uncertainty and noise. The presented algorithm also provides a reduction in the search space, reducing the computational cost.

SUMMARY OF THE INVENTION

The present invention overcomes the foregoing problems and other shortcomings, drawbacks, and challenges of the registration of partially-overlapped imagery. While the invention will be described in connection with certain embodiments, it will be understood that the invention is not limited to these embodiments. To the contrary, this invention includes all alternatives, modifications, and equivalents as may be included within the spirit and scope of the present invention.

The present invention provides a novel processing technique for automatic registration of partially overlapped aerial imagery, with possible translation and rotation. For DoD and homeland security applications, the surveillance needs of large critical infrastructures and key resources may span for miles, and demand a field of view that exceeds that provided by a single airborne sensor. Image registration of aerial imagery can increase the field of view without any modification to the optics, focal plane array, and associated hardware of an imaging system. The presented algorithm also provides a reduction in search space, reducing the computational cost of registration. The approach differs from current techniques as it utilizes both area-based and feature-based techniques to compensate for deficiencies in either approach. The algorithm provides robust performance in the presence of system uncertainty and uses system resources more efficiently, which speeds up image processing, and permits more processing at the same time.

According to one embodiment of the present invention, a method for registration of partially-overlapped images comprises: performing noise reduction and feature extraction in a reference image and an unregistered image; determining a template size using a phase transition methodology for a sufficiently-sampled finite data set; identifying a template region in the reference image; performing a wide angle estimation of the reference image and the unregistered image; performing orientation and translation of the reference image and the unregistered image; performing a search space reduction of the reference image and the unregistered image; performing a coarse angle estimation of the reference image and the unregistered image; performing orientation of the reference image and the unregistered image of the coarse angle estimation; and performing a fine angle estimation and registration of the reference image and the unregistered image.

This method may reduce the number of image orientations used, and also may reduce the number of mathematical operations used in registering partially-overlapped images. This may result in faster computer operations and saves time, which is a valuable commodity when defense and security operations are being performed. A reference image is an image to which another image, e.g. an unregistered image, is compared. An unregistered image is an image which is compared to the reference image. The unregistered image may be manipulated, e.g. translated and rotated, during the comparison with the reference image. When the appropriate rotation, translation and overlap are determined, the unregistered image is able to be registered with the reference image. This registration may result in the creation of a new reference image. A sufficiently-sampled finite data set may be determined by the number of pixels in an image, and such determination, i.e. whether the finite data set is sufficiently sampled, is based on entropy. Entropy may be defined generally as the number of states a system can adopt. Low entropy may mean a lower number of states may be adopted by a system.

Regarding the phase transition methodology, this method enables one to calculate the actual number of entropy states in an image as a function of number of pixels in the image. When entropy is plotted as a function of the number of pixels, at first the entropy increases or is in a transition phase. However, as the entropy curve levels off after the initial transition, the number of pixels at which the curve levels off or becomes flat represents the number of pixels or samples corresponding to a sufficiently-sampled finite set, and the entropy value corresponding thereto is the actual number of entropy states. A sufficiently-sampled set is the number of samples (ensemble size) which puts the entropy estimate beyond the linear trajectory regime and into the phase transition point.

In other words, the image alignment/registration algorithm makes use of several novel entropy-based techniques. These techniques employ entropy estimation methods that require a minimum number of data samples to support reliable estimates. The phase transition plots (illustrated below) provide an illustration of the estimate value as a function of the sample number (ensemble size). The entropy estimate will increase on a linear trajectory (log scale) as a function of the number of samples used to estimate the entropy. At some point the linear trajectory will end and 'roll over' to a constant estimate. The point at which the estimate 'rolls over' is called the phase transition point. At the phase transition point, the probability mass function (which is used in the entropy estimate technique) is sampled to a point where the mass function takes on its proper statistical form. Prior to the phase transition point, the probability mass function is not sufficiently 'filled' with samples to provide the proper statistical shape. The linear trajectory regime of the phase transition plot is indicative of the fact that the many cells within the mass function are filling for the first time and look like a uniform distribution from a statistical stand point. At the phase transition point the cells within the mass function have encountered many repeated data points and are resulting in the proper statistical shape of the mass function.

The step of "performing a wide angle estimation of the reference image and the unregistered image" may use a "reduced search space" for finding a match to the reference template. This operation may be done on pixel-by-pixel basis, which is computationally intensive. All pixels of the reference template may be used to calculate correlation for every pixel that is moved in the unregistered image. Once the matched template is identified using normalized cross correlation (NCC), variation of information may be calculated between the reference and matched template. This allows circumventing the pixel-by-pixel operation, and instead provides a cost function (or a second measure) for the template matching.

The angle space for the coarse angle estimation ($\theta CA$) may be determined by the wide angle stage as a function of $\theta WA$. The angle space is the set of all possible angle vectors for a given set of conditions e.g. the possible angles and relationships between each image and the associated camera. The coarse angle range may be defined as the wide angle $\theta WA \pm (\alpha - 1)$ degrees. For coarse angle $\theta CA$ determination, the rotation search may span from $\theta WA - (\alpha - 1)$ as the starting point to $\theta WA + (\alpha - 1)$ as the final orientation. The interval parameter $\alpha CA$ may be fixed as a 1-degree interval but can be varied depending on the image size. The overlay plus the margin provides the reduced search space for normalized cross correlation.

Once the coarse angle $\theta CA$ value is determined, the fine angle range may be defined as the coarse angle $\theta CA \pm 0.9$ degree. In this step calculations may be done with increments of 0.1 degree, but depending on the image size could be varied, and the fine angle of rotation is calculated. In both coarse and fine cases, multiple templates may be employed within the reduced search space to construct an angle vector, and the mode of the angle vector determines the image orientation. To augment the approach, information theoretic measures may be used in both coarse and fine angle estimation.

According to a first variation of the method, the step of determining a template size using a phase approach for a sufficiently-sampled data set further comprises calculating the maximum possible entropic states and actual entropic states as a number of intensities present in the pixels of a given reference and unregistered image. In digital imagery, there is a relationship between the maximum possible entropy states and the actual entropy states. An image acquired by a digital camera has the scene intensity defined by the number of bits in the analog to digital converter (ADC). An 8-bit ADC, for example, will have $2^8 = 256$ shades of gray. Therefore the maximum possible entropy states for that image will be 256. However, a particular scene may only have 41 shades of gray. In that case, the actual entropy states are 41.

This variation of the method provides an easy way to determine the sufficiently-sampled finite data set by reducing to maximum possible entropy states for an image to the actual number of entropy states. This may result in faster computer operations and may save time.

According to another variation of the method, the step of determining a template size using a phase approach for a sufficiently-sampled data set further comprises determining template size with an m×m template, where m is a power of 2; wherein the total number of pixels M=m×m is equal to or greater than the number of pixels identified by the phase transition methodology.

This variation provides a more efficient manner for a computer to perform the required calculations.

According to a further variation of the method, the step of performing a coarse angle estimation of the reference image and the unregistered image further comprises performing sequential normalized cross-correlation (NCC) in the reduced search space.

This variation provides a reduced search space to find a match to the reference template, and once a match is found the pixel-by-pixel operation is circumvented, which provides a cost function.

According to another variation of the method, the step of performing a coarse angle estimation of the reference image and the unregistered image further comprises performing a mutual information-based variation of information.

This variation provides an advantage in that it verifies and validates the result of NCC with variation of information and reduces the set of possible angles to plus or minus 1 degree.

According to a further variation of the method, the step of performing a fine angle estimation of the reference image and the unregistered image further comprises performing sequential normalized cross-correlation in the reduced search space.

This variation provides a reduced search space to find a match to the reference template, and once a match is found the pixel-by-pixel operation is circumvented, which provides a cost function.

According to another variation of the method, the step of performing a fine angle estimation of the reference image and the unregistered image further comprises performing a mutual information-based variation of information.

This variation provides an advantage in that it verifies and validates the result of NCC with variation of information and reduces the set of possible angles to plus or minus 1 degree.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 1F-1G depict an input image and an output image, respectively, of an edge detect function with 10 dB noise, according to an embodiment of the invention;

FIGS. 1H-1I depict an input image and an output image, respectively, of an edge detect function with 15 dB noise, according to an embodiment of the invention;

FIGS. 5A-5B illustrate a template-matching process according to an embodiment of the invention, wherein an m×m template from a reference image is searched pixel-by-pixel for a match using a similarity measure in the unregistered image, according to an embodiment of the invention;

FIG. 5E presents windows which may be used in the calculation of the NCC coefficient values for a match in an unregistered image;

FIGS. 6A-6B depict the application of normalized cross correlation (NCC) with varying reference templates to a reference image and an unregistered image, according to an embodiment of the invention;

FIGS. 7A-7B illustrate matched template coordinates for peak NCC coefficient values, according to an embodiment of the invention;

FIGS. 25B-25C present the processing time on an 1-7 machine running windows 7 as the operating system;

FIGS. 29B-29C present the number of operations for both image set 1 and 2 using the traditional NCC approach and a reduced search space approach;

FIGS. 30A-30C illustrate a reference image, an unregistered image, and a registered image in the visible spectrum, according to an embodiment of the invention;

FIGS. 31A-31C illustrate a reference image, an unregistered image, and a registered image in the SWIR spectrum, according to an embodiment of the invention;

Figure 1A:
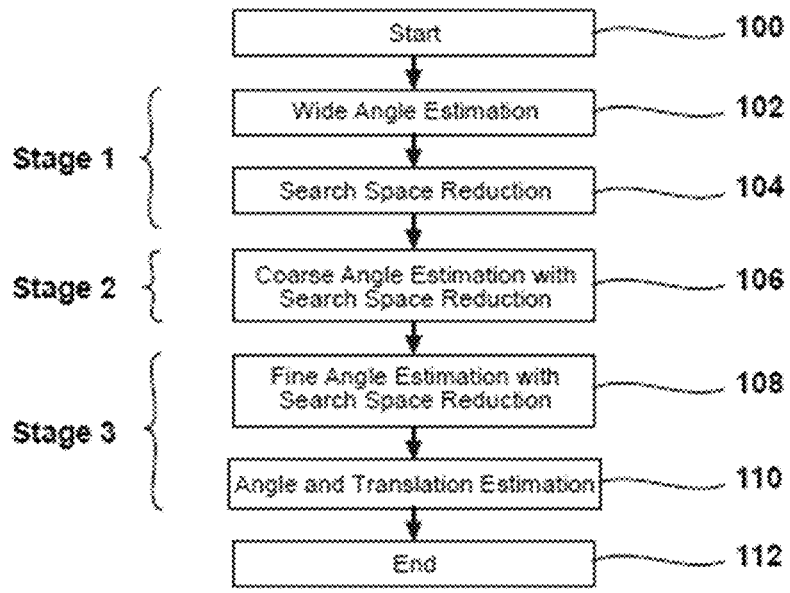
FIG. 1A is an illustration of a method for multi-stage registration of partially overlapped imagery, according to an embodiment of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Before any exploration into registration techniques is discussed, the images of interest need to be identified. This is due to the fact that images will dictate, to some degree, the appropriate techniques for registration. The characteristics are defined for the input images, e.g. reference images and unregistered images, as follows:

1: Images are acquired by same sensor for data acquisition which in this case was an airborne platform, maintaining a constant and high altitude during the collection of images.

2: As with most of the airborne platforms it is assumed that there was possible rotation present between the reference and unregistered image. For algorithmic requirements the rotation was at ±20°. The convention for rotation was counter clockwise rotation was positive and clockwise rotation is negative.

3: The images are partially overlapped and therefore registration in this case would result in a panoramic view.

4: No a priori knowledge of image orientation and amount of overlap between the two images and therefore no algorithmic customization can be designed to resolve the registration problem.

5: The images collected can be either urban or rural scenes. This implies that the registration algorithm should be operational in both scenarios, with images containing large number of structures or very few structures.

Affine transformation is one of the most commonly used spatial coordinate transformations. The transformation places the pixels from the unregistered image to the plane of the registered image so that the shared pixels between the two images are aligned. Affine transformation in general can be governed by rigid transformation equation. The above defined initial conditions feed into the design of the algorithm. Since mono modal imagery is being used, both reference and unregistered images are of same size. Also high altitude (defined as over 10,000 ft.) eliminates scaling. Equation 1 represents the rigid transformation from image I1 to I2 requiring scaling, rotation, and translation as the registration parameters.

$$\vec{I_2} = \vec{t} + sR\vec{I_1} \quad (1)$$

Where, $$\vec{t} = \begin{bmatrix} t_1 \\ t_2 \end{bmatrix}, R = \begin{bmatrix} \cos\theta & -\sin\theta \\ \sin\theta & \cos\theta \end{bmatrix} \quad (2)$$

Here "s", "$\vec{t}$", and "R", in Equation 2, are the parameters representing scaling, translation, and rotation, respectively.

Setting the scaling parameter s=1 for no scaling $$\vec{I_2} = \vec{t} + R\vec{I_1} \quad (3)$$

The estimation approach can now be written as shown in equation 4. α, β, and γ are translation and rotation parameters calculated in Stages 1, 2, and 3 of the algorithm. The output of Stage 1 are the wide angle values and reduced search space map. Output of Stage 2 is the coarse angle registration parameters, and the output of Stage 3 is the fine angle registration parameters which are used to finally register the input image and the reference image.

$$\begin{bmatrix} I_1 \\ I_2 \end{bmatrix} -> \begin{bmatrix} \psi_1 \\ \psi_2 \end{bmatrix} -> \begin{bmatrix} \psi_1 \\ \alpha\psi_2 \end{bmatrix} -> \begin{bmatrix} \psi_1 \\ \beta\psi_2 \end{bmatrix} -> \begin{bmatrix} \psi_1 \\ \gamma\psi_2 \end{bmatrix} \quad (4)$$

Pre-Processing  Stage 1  Stage 2  Stage 3

FIG. 1A is an illustration of a method for multi-stage registration of partially overlapped imagery. In the first stage, the method starts (step 100) with a wide angle estimation (step 102) followed by search space reduction (step 104). In stage 2, the method performs coarse angle estimation with search space reduction (step 106). In stage 3, the method performs fine angle estimation with search space reduction (step 108) and angle and translation estimation (step 110), which ends the method (step 112).

Figure 1B:
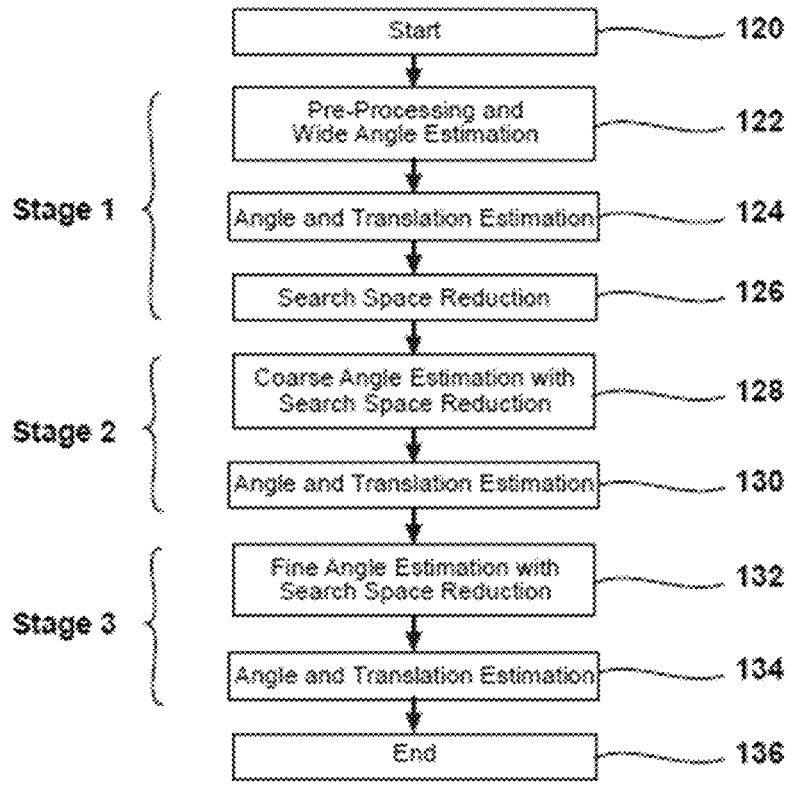
FIG. 1B is an illustration of a method for multi-stage registration of partially overlapped imagery including pre-processing and angle and translation estimation, according to an embodiment of the invention.

Similar to FIG. 1A, FIG. 1B is an illustration of a method for multi-stage registration of partially overlapped imagery including pre-processing and angle and translation estimation. In the first stage, the method starts (step 120) with pre-processing and wide angle estimation (step 122) followed by angle and translation estimation (step 124) and search space reduction (step 126). In stage 2, the method performs coarse angle estimation with search space reduction (step 128) and angle and translation estimation (step 130). In stage 3, the method performs fine angle estimation with search space reduction (step 132) and angle and translation estimation (step 134), which ends the method (step 136). Stage 1 in FIG. 1B is different from the other two stages, i.e. stages 2 and 3, as it employs pre-processing, and calculates the parameters for search space reduction. Stage 2 and Stage 3 are similar as they may both utilize the same similarity measures and search space reduction to determine both coarse angle and fine angle of rotation along with other registration parameters.

Figure 1C:
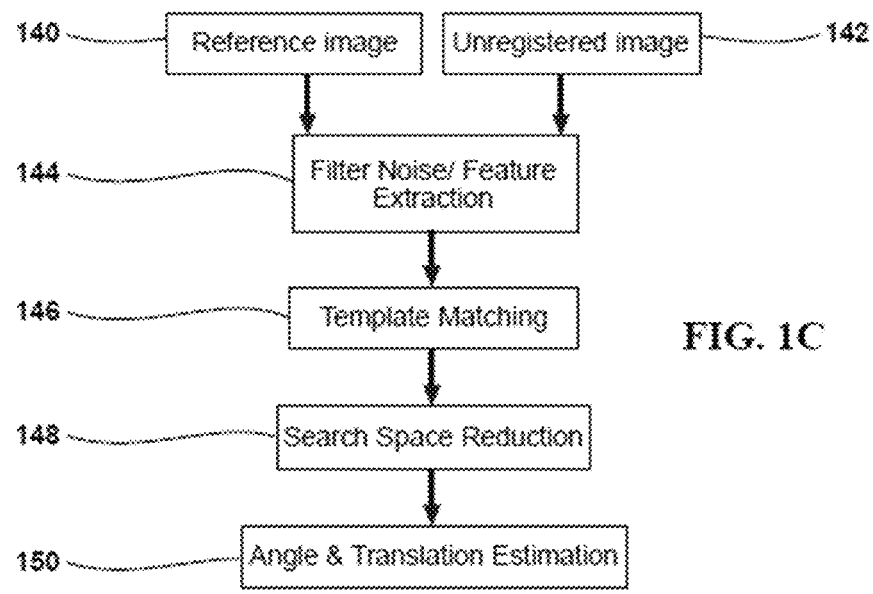
FIG. 1C depicts a method for angle and translation estimation, according to an embodiment of the invention.

FIG. 1C illustrates a method for determining wide angle estimation and translation parameters. The reference image 140 and unregistered image 142 are the images of interest, and are described in greater detail below. The second block is the preprocessing of images to reduce noise and perform edge feature extraction 144 as further described below. Template matching 146 using normalized cross correlation (NCC) is described more below, and is then used to determine a wide angle of rotation, and to determine the translation coordinates for the calculated wide angle match. Both of these parameters are then used to determine the reduced search space 148. The wide angle registration parameters, i.e. the angle and translation values, and reduced search space are then utilized in the next stage.

The output of the wide angle stage (of FIGS. 1A-1B) is then used as an input to a coarse angle estimator. The wide angle determined in the first stage serves as the bound for coarse angle calculations, and the translations are used in search space reduction. After the calculations are complete for the coarse angle estimation, the output is then used as the input to the fine angle stage, and final calculations of the registration parameters are completed.

Figures 1D, 1E:
FIGS. 1D-1E depict an input image and an output image, respectively, of an edge detect function, according to an embodiment of the invention.

Noise reduction is a common first step in many processing techniques and there are a variety of filters available to do so. Noise reduction is important because noise can hinder the process of edge detection. Sharp discontinuities in pixel intensities in an image constitute edges. Edges are formed by shadows, topologies, and the structures present in the scene. FIGS. 1D-1E depict an input image (FIG. 1D) and an output image (FIG. 1E) of an edge detect function. FIG. 1D depicts an original image with no added noise, and FIG. 1E depicts an output image of the edge detector. The output image (FIG. 1E) shows the outlines of the two faces and additional features in the background with the rest of the image space as uniformly black.

FIG. 1F depicts FIG. 1D with added impulse noise at 15 dB signal to noise ratio (SNR). For this specific instance the signal to noise ratio is calculated with respect to the image in FIG. 1D. Although FIG. 1F looks slightly grainy, FIG. 1F shows the effect of noise with false edges appearing in addition to the edges that are present in FIG. 1D. FIG. 1F depicts an image with impulse noise at 15 dB SNR; the image contrast is diminished slightly but it is easy to recognize the faces. FIG. 1G depicts an output image of the edge detector which is showing some additional features due to the noise present in the images. However, the outlines for the two faces can still be identified at this point. FIG. 1H depicts the image in FIG. 1D with increased noise. The added impulse noise is at 10 dBs SNR. The distortions started appearing at an SNR of 15 dBs as shown in FIG. 1F. However, as the SNR is reduced to 10 dB the distortion clearly starts dominating the output image of the edge detector by providing noise induced features in the output FIG. 1I. The image in FIG. 1H shows the effect of noise because the image appears grainy. However, the faces can still be identified. However, after the edge detection algorithm is applied, the effect is so pronounced in FIG. 1I that it becomes extremely difficult to ascertain the outline of the two faces.

The methods for identifying and locating edges in a scene fall in the class of edge detectors. However, edge detection algorithms are not immune to the noise present in an image. Since these edge detectors are scanning the image for discontinuities in the pixel intensities they can be easily affected by the noise present in the pixels. These noisy pixels produce false edges, which are especially undesirable in remote sensing, as a structure of interest may be very small and therefore may be easily distorted by the noise.

Wavelets may be considered as an extension of Fourier analysis. Wavelets may be an alternative to the Fourier transform, and have been shown to produce better results when compared to traditional edge detectors. Wavelets are limited duration waveforms that may or may not be symmetric. These waveforms provide superior results when describing events that start and stop within the signal. In contrast with a Fourier transform, which displays all the frequencies of a signal regardless of time or space when they occur, the wavelet transform displays the frequency with respect to time or space. Wavelets capture high frequencies over a short time period, and capture low frequencies over longer time periods. This enables the use of a wavelet transform as a feature extraction tool.

Figure 2:
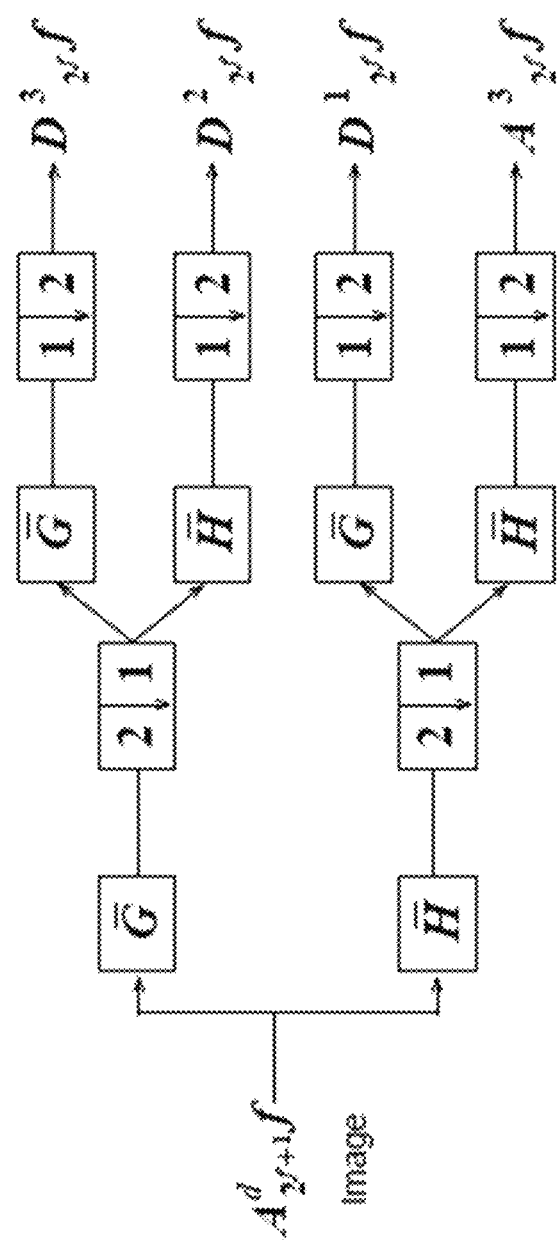
FIG. 2 illustrates the decomposition of an image into sub-images using Mallat's scheme, according to an embodiment of the invention.

Edges in an image may be formed by sharp variations in pixel intensities. Edges of large objects may be obtained at low resolutions, and those of smaller objects may be obtained at fine resolutions because these variations occur at different scales. The wavelet based multi-resolution analysis may be used to address the issue of determining edges at different scales because traditional edge detector models do not have a concept of scale. The multi-scale operation based on "approximation image" and "detail image" was developed and derived by Stephane Mallat. Mallat's pyramidal scheme, illustrated in FIG. 2, basically decomposes signals into sub-bands. In FIG. 2, 'A' corresponds to approximation image, 'D' corresponds to detail image, 'G' and 'H' are the output of an image for detail and approximation, respectively. This chart was developed by Mallat and is well-documented in literature.

The wavelet based decomposition provides varying scales, and controls the significance of detected edges. Smaller numbers of wavelet decomposition provide high resolution and small scale but sharper edges survive the wavelet transform across subsequent scales. However, as the number of decomposition levels grows, the details in the image are attenuated and edge delocalization effects come into play. The wavelet used in this algorithm is the cubic spline as it is isotropic and eliminates the need for Ix and Iy type gradient operations spatial masks. In addition, the cubic spline behaves like a Gaussian filter. The appeal of a Gaussian filter for noise reduction is due to property of the Gaussian that the frequency response of a Gaussian function is a Gaussian function in the transform domain. This makes it efficient in removing white noise and preserving edges. The Ix and Iy masks respond to edges in a given image running horizontally and vertically, respectively. The gradient absolute magnitude and orientation, θ, can then be calculated using Equation 5.

$$\text{abs}(Ixy) = \sqrt{Ix^2 + Iy^2} \text{ and } \theta = \tan^{-1}\frac{Iy}{Ix} \quad (5)$$

There operations may be simply replaced by a cubic spline mask, which reduces the computational intensity for feature extraction. Since the cubic spline is an isotropic function the features are extracted and preserved for processing. Once the images are filtered, the next step is template matching. FIGS. 3A-3B and 4A-4B illustrate the original, first, second, and third levels of decomposition using a wavelet spline.

Figure 3A:
FIGS. 3A-3B depict an unprocessed image, as well as images processed with $1^{st}$ level wavelet decomposition, according to an embodiment of the invention.
Figure 3B:
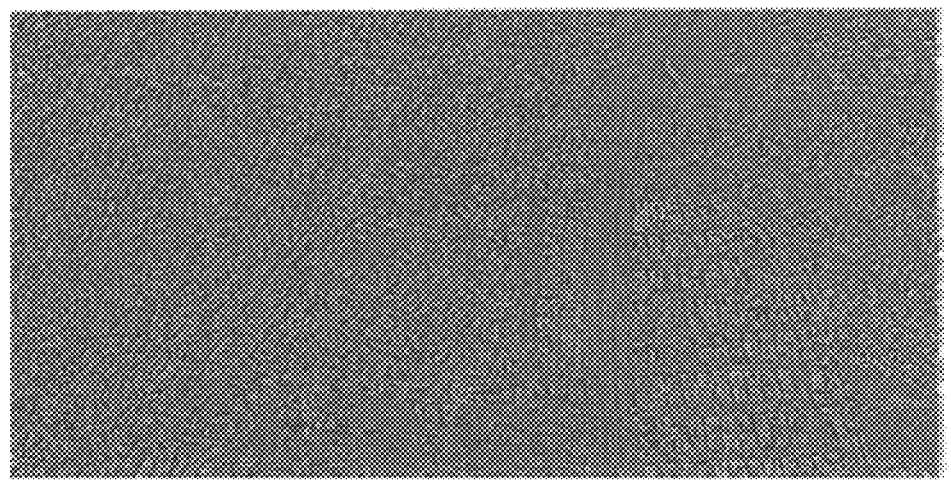

FIG. 3A illustrates an aerial image of an urban scene that is densely populated. FIG. 3B illustrates $1^{st}$ level wavelet decomposition with gray scale intensities using Malat's scheme for feature extraction. The reduction of noise reveals features with fine outlines. Such outlines tend to become more prominent with increased levels of decomposition.

Figure 4A:
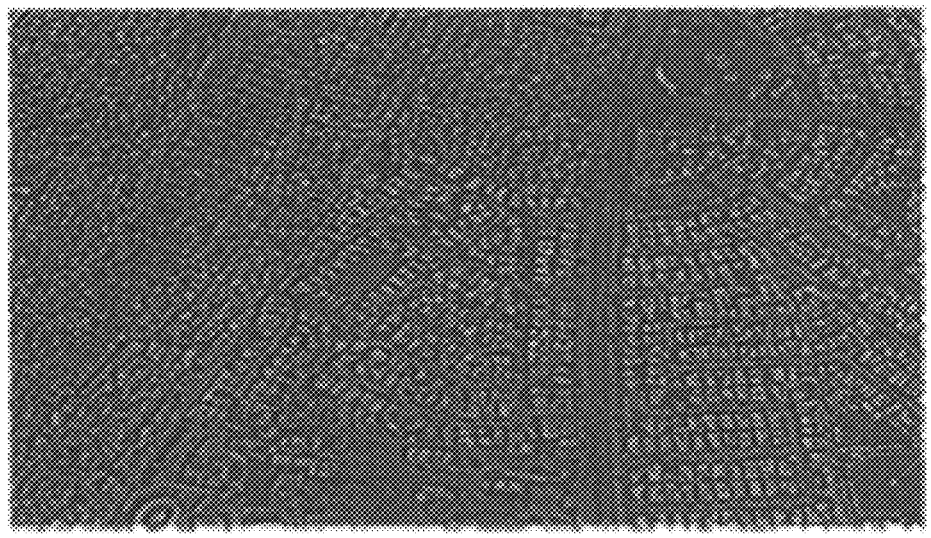
FIGS. 4A-4B depict images processed with $2^{nd}$ and $3^{rd}$ level wavelet decomposition, according to an embodiment of the invention.
Figure 4B:
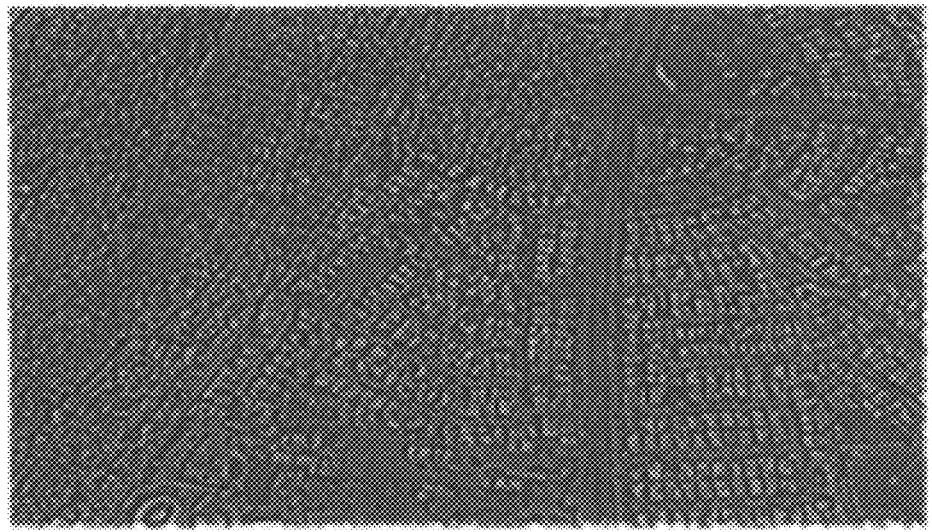

FIG. 4A illustrates $2^{nd}$ level wavelet decomposition. Notice that the image has lower noise than that of FIGS. 3A-3B and the features have become more prominent. FIG. 4B illustrates $3^{rd}$ level wavelet decomposition, such that the features of the image have become yet more prominent and thick, with a sligh showing of edge de-localization effect.

Although there are multiple methods for deriving a convolution mask, the cubic spline coefficients developed from the polynomial $$H(z) = \left(\frac{1+z^{-1}}{2}\right)^N$$

may be the most straightforward approach. A spline of degree N requires convolution of N+1 box functions with the cubic spline vector being therefore defined by the following equation: B3=B*B*B*B.

B represents the box function. The B3 vector is calculated with successive convolutions in the spatial domain. Once the desired vector is obtained, the 2-D convolution mask can be developed because the cubic spline is symmetric.

Template Matching

Template matching is the process of selecting a template from the reference image 140 and finding a corresponding template in the unregistered image 142. Templates of selected sizes or even entire images may be used for similarity measures. Here, a template is defined as a sub-scene image, and therefore, smaller than the image itself. FIGS. 5A-5B illustrate the process of template matching. A template 200 of size m×m may be selected from the reference image 140 and moved pixel by pixel in the unregistered image 142, searching for a match. At each location (each movement of the template 200 by a pixel is a new location), a similarity score may be calculated by using a similarity measure, i.e. the output of equation 2-6 (see page 23) for any pixel value provides a number which is the similarity score, and equation 2-6 is a similarity measure NCC. Depending on the similarity measure, either the highest or the lowest score may represent the best match of the template 200 from the reference image 140.

Before getting into the details of the similarity measure itself, the selection of the template 200 should be addressed. While selecting the template 200 two factors may be addressed: 1) Location of the reference template
2) Size of the template The performances of similarity measures may depend on the size of a given template 200 and therefore the template size may need to be selected carefully. A larger template 200 may provide more intensity variations and enhanced accuracy, but at the cost of increased computational intensity. Although techniques that select patch size (patch size=template size) adaptively have been investigated, the drawback in these techniques is trading off the increased computational intensity of a large template for the reduced precision of a smaller template size.

Template Location

Location of a template should be chosen carefully, to ensure maximum possibility that a matching template will be found in the unregistered image which may be been rotated and translated. The template region may be selected in the rightmost side of the reference image 140, as illustrated in FIG. 5A, starting at approximately the 25 percent point for the number of (horizontal) rows, and extending to approximately the 75 percent of the number of rows in the image. This approach may be selected because the rotation of the unregistered image may cause the top or the bottom corner of the unregistered image to be completely eliminated from the scene. Therefore a template of that region from the reference image will usually not have any significant normalized cross-correlation (NCC) value at or near a match in the unregistered image. This template region of FIG. 5A may be covered by multiple overlapping templates of the same size. Equivalent templates are then determined, employing a similarity measure, in the unregistered image, forming a corresponding template region in the unregistered image, as illustrated in FIG. 5B. The template region provides multiple values for image orientation and translation which may help mitigate these calculations in the presence of noise.

Effects of Template Size on the NCC Metric

Normalized cross-correlation (NCC) may be a similarity measure employed in two overlapping images. The two images used in this particular analysis (only as an example) may be collected with a hyper-spectral aerial sensor. In the case of a hyper-spectral image we have two overlapping data cubes, so in essence we have the same overlapping image pair in multiple spectrum bands. The hyper-spectral data was selected because it provides an opportunity to apply NCC in multiple bands over the same scene with varying degrees of intensity and noise. It may also allow the use of various template sizes in multiple bands over the same scene with varying degrees of intensity and noise.

NCC is a similarity measure employed in two overlapping images, the reference image and the unregistered image. A sub-image or a patch may be taken from the reference image and compared with all possible locations in the unregistered image, from which a cross-correlation matrix may be calculated. A threshold may then be applied to the normalized cross-correlation (NCC) matrix to select the best possible match for the reference sub-image. Instead of selecting the threshold for comparison, only the peak NCC value may be considered for registration purposes with multiple sub-scene template sizes or windows utilized to create corresponding NCC coefficient matrices.

The objective here is twofold, one to determine if the same area is identified in all or most of the bands relating to peak NCC values; and then if the peak value related to the same window size or a very narrow range of window sizes.

In this particular hyperspectral example, the noise and intensity variation in the image increases from the visible to the infrared part of the spectrum. Such variables also depend on the focal plane array, and the designed response for the particular broad band detectors that are used. Therefore, two overlapping images may contain the same partial image in their field of view but also have different intensities or radiometric responses for the pixels. The normalization part of the NCC method reduces all the intensities in both the reference and unregistered image to stretch out between 0 and 1.

Two consecutive overlapping hyper-spectral data cubes are selected, which cover the spectral regions from the visible to the short wave infrared (SWIR). FIG. 5A is selected as the reference image and FIG. 5B is selected as the unregistered image. Fourteen different size windows with their corresponding window numbers assigned are shown in FIG. 5E, covering the same locations in the reference image 140 that are selected. These windows may then be used in the calculation of the NCC coefficient values for a match in the unregistered image 142. In this example, we start with the largest sub-image template size of 63×63 and work our way back to the smallest window size of 11×11. In addition, the size range also ensured a cross-correlation value of 0.9 or higher through most of the spectral range.

FIGS. 6A-6B illustrate the reference image 140 and the unregistered image 142. The unshaded area(s) 144, 146 represent the overlap between the two images, and ($x_{1a}$, $y_{1a}$) are the coordinates of the lower right corner of the sub-image or window that is referenced in FIG. 5C. While the overlap area(s) in FIGS. 6A-6B are shown in the horizontal direction or x-axis, depending on the imagery, same scenario may be applied in the vertical direction or y-axis.

Once the matching window is found with peak NCC in the unregistered image, the lower right corner coordinates are represented by ($x_{1b}$, $y_{1b}$). If the same area is matched by windows of various sizes then the y-coordinate will remain unchanged or will be very close to each other in values, i.e. $y_{1b} \approx y_{2b} \approx y_{3b} \approx \ldots \approx y_{14b}$ and only the x-coordinate will change with an increase in the size of the window. This does not guarantee that the two sub-images are the same but the similarity between them is large.

The calculations are executed for the visible spectrum 400 nm to 700 nm, the near Infrared (NIR) spectrum 700 nm to 1.4 microns, and the short wave infrared (SWIR) 1.4 to 2.4 microns. The SWIR spectral region is further broken down as lowSWIR and highSWIR to provide more resolution in the corresponding plots. A single graph for each region is also attached, to show the window range in that region for the number of bands assigned to the region, and the (xib, yib) location for the position in the unregistered image.

Figure 5C:
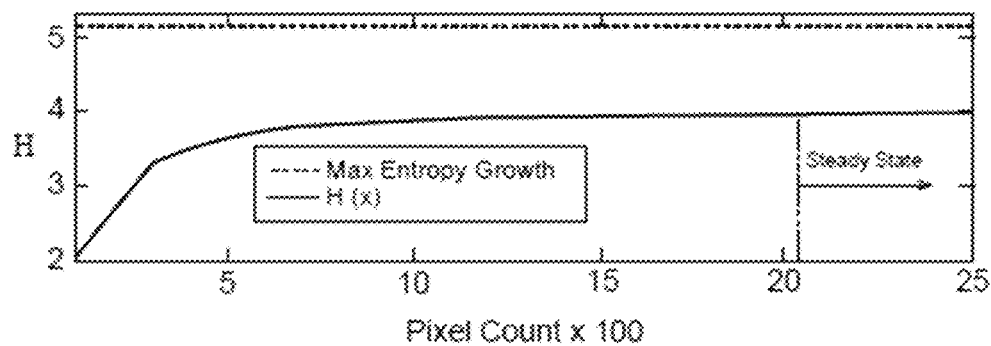
FIGS. 5C-5D depict phase transitions showing maximum possible entropic states and actual level occupied as a function of number of pixels, according to an embodiment of the invention.

FIGS. 7A-7B illustrate matched template coordinates (x, y) for peak NCC coefficient values in the visible spectrum, with x values in FIG. 7A and y values in FIG. 7B. These are the window coordinates for all 14 windows used in the visible spectrum. The 'x' values are between 82 and 83, and there are 14 'y' values corresponding to the window sizes used in the peak NCC calculations. FIG. 5C depicts the number of windows from an 11×11 to 63×63 template sizes in increments of 4, which results in 14 different window sizes. Restricting the window size to $2^6$ allows one to observe the effects of window size on template matching. In addition, keeping the window size as reasonably small as possible is useful for process because next step up, with powers of 2, would be 128×128.

Figure 8B:
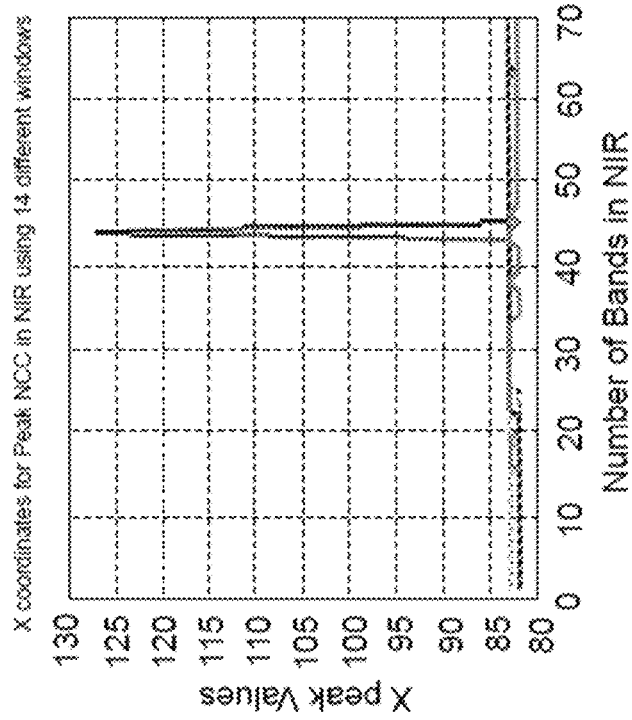
FIGS. 8A-8B illustrate matched template coordinates for peak NCC coefficient values, according to an embodiment of the invention.
Figure 8A:
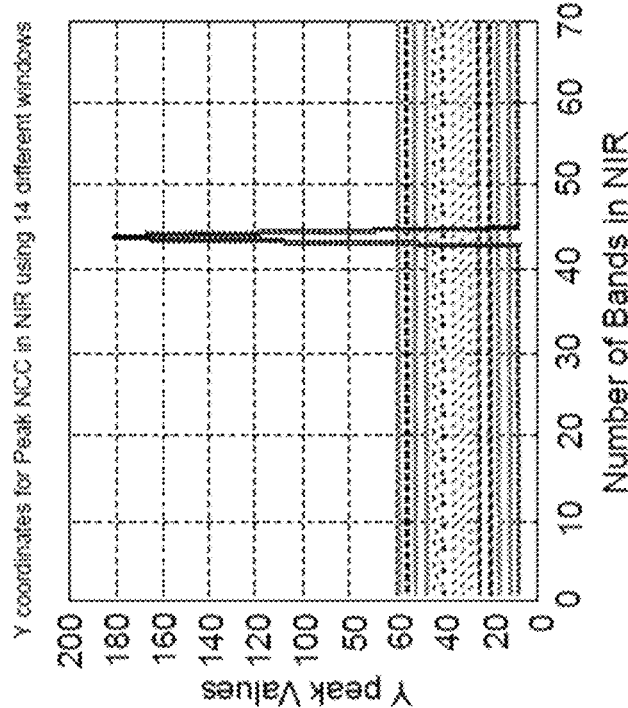

FIGS. 8A-8B illustrate matched template coordinates (x, y) for peak NCC coefficient values in the near infrared spectrum, with x values in FIG. 8A and y values in FIG. 8B. These are the window coordinates for all 14 windows used in the near infrared (NIR) spectrum. The 'x' values are between 82 and 83, and there are 14 'y' values corresponding to the window sizes used in the peak NCC calculations. The distortion is present in both 'x' and 'y' peaks for the window size 11×11 for bands 43 thru 45. This effect can also be seen in the window size vs NCC value graph. However, as the window size increases, the peak locations become uniform.

Figure 9:
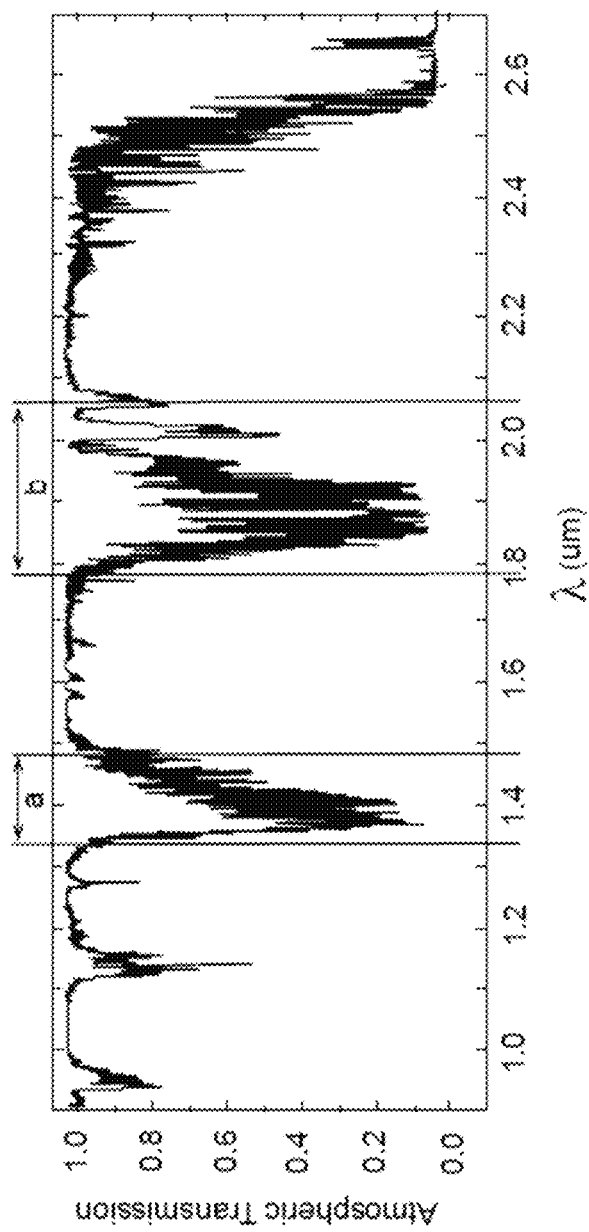
FIG. 9 illustrates atmospheric transmittance in the visible through SWIR regions, according to an embodiment of the invention.
Figure 10A:
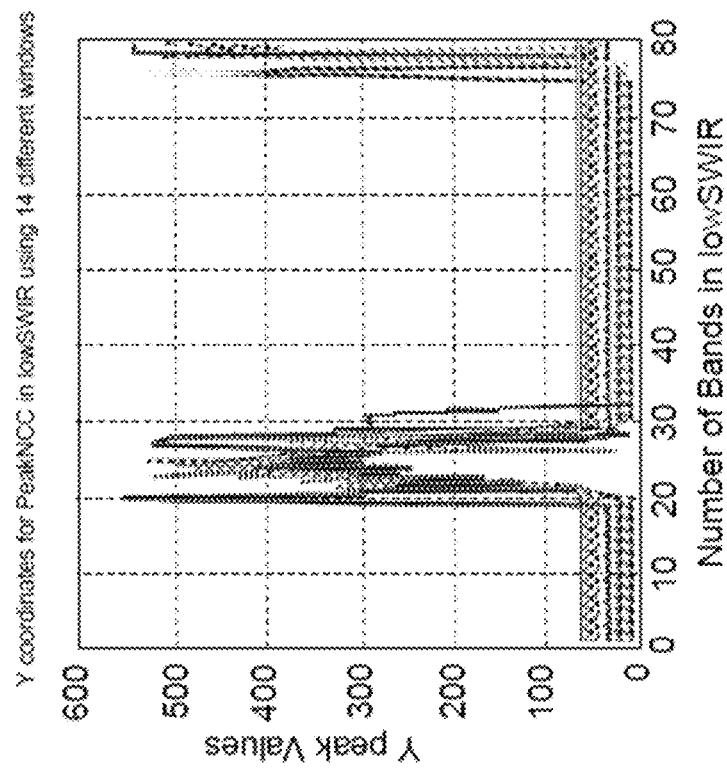
FIGS. 10A-10B illustrate matched template coordinates for peak NCC coefficient values in the lowSWIR spectrum, according to an embodiment of the invention.
Figure 10B:
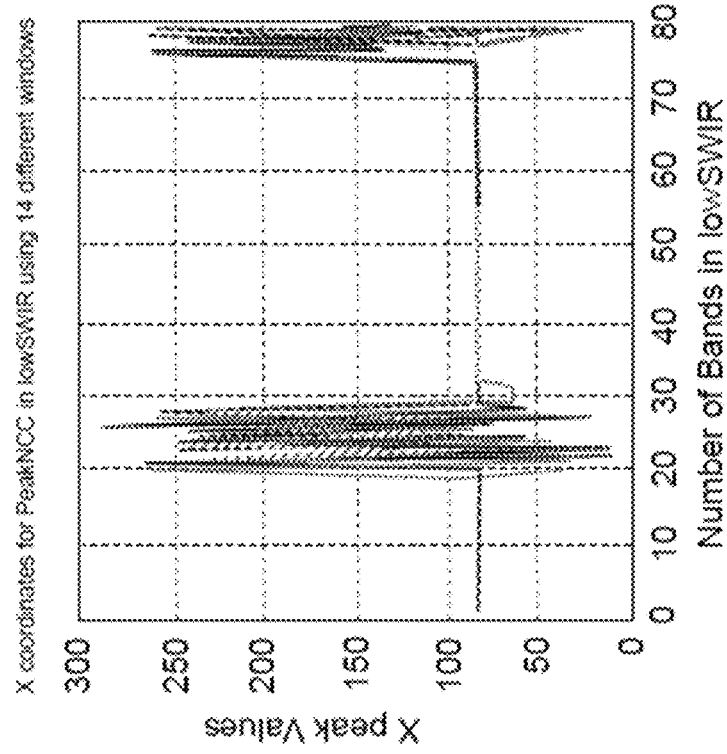

The SWIR is split into two bands, lowSWIR and highSWIR. More noise starts presenting itself at the beginning of lowSWIR. FIG. 9 illustrates atmospheric transmittance in visible through SWIR where region "a" illustrates the atmospheric absorption band at the start of the shortwave spectrum, and region "b" illustrates the atmospheric absorption band in the middle of the shortwave infrared spectrum. The atmospheric transmittance zone 'a' in FIG. 9 affects the noise, and intensity present in the image. FIGS. 10A-10B illustrate that this in turn affects the NCC calculations, and consequently the sub-image location. However, in the stable part of the transmittance window the 'x' values are between 82 and 83, and there are 14 'y' values corresponding to the window sizes used in peak NCC calculations.

Figure 11B:
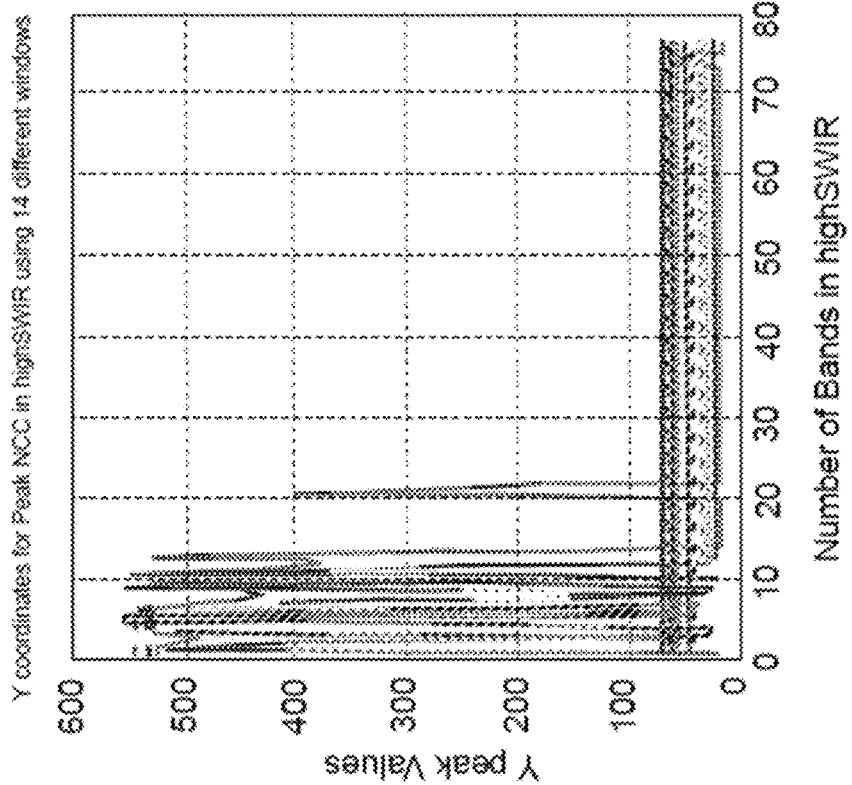
FIGS. 11A-11B illustrate matched template coordinates for peak NCC coefficient values in the highSWIR spectrum, according to an embodiment of the invention.
Figure 11A:
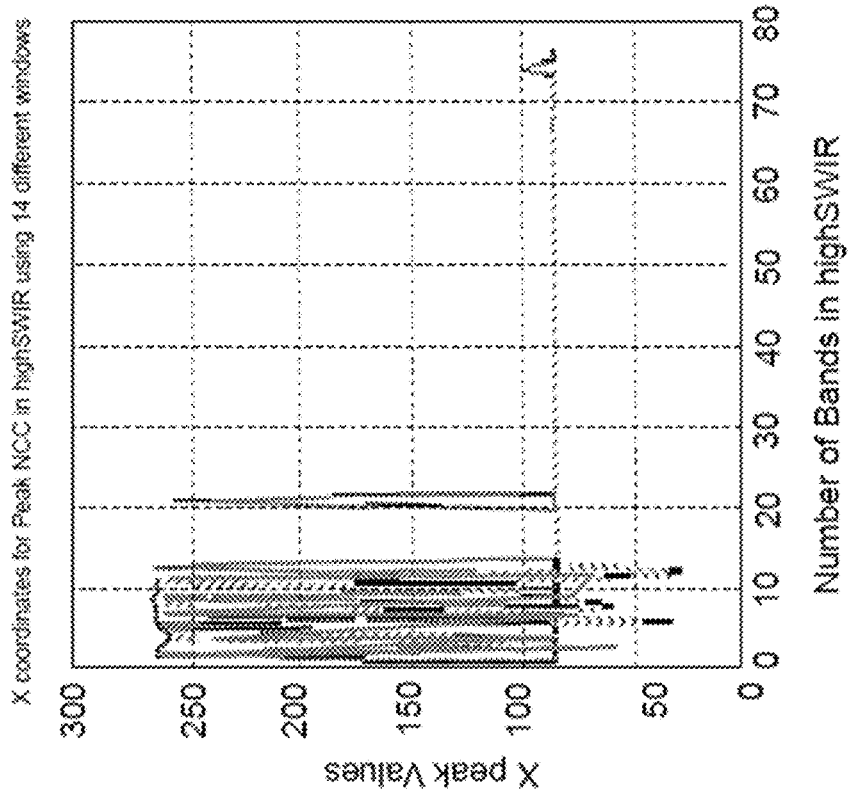

The atmospheric transmittance pattern illustrated in FIG. 9 dominates the performance of NCC calculations, and consequently the sub-image location for the upper or 'high' part of SWIR. FIGS. 11a-11B illustrate the effects of transmittance in the highSWIR band, which in part may also be affected by the response of the broadband detector and the frontend optics in this case. However, once again, in the stable part of the transmittance window the 'x' values are between 82 and 83, and there are 14 'y' values corresponding to the window sizes used in peak NCC calculations.

For this instance the NCC calculations demonstrate that the visible spectrum is low noise and allows the atmospheric transmittance with relatively less variation. However, the NIR and SWIR have atmospheric transmittance, which affects the intensity received by a sensor, and makes NCC less effectives within these pockets of large transmittance variations.

As mentioned before, the performances of both NCC and VI (variation of information) measures depend on the size of a given template, and therefore the template size needs to be selected carefully. The larger size of the template will provide more intensity variations and enhanced accuracy which comes at the cost of increased computational intensity. Conversely a smaller template size may have reduced computational cost but then the algorithm is trading off precision for computational ease. FIGS. 12 through 15E illustrate the peak NCC values for template sizes ranging from 11×11 to 63×63 increasing with increments of 4. NIR is divided into 5 subsections to display the graphs with better resolution, and the same approach is applied for the SWIR spectrum by first dividing it into lowSWIR and highSWIR, and then dividing each into 5 sub-sections.

Figure 12:
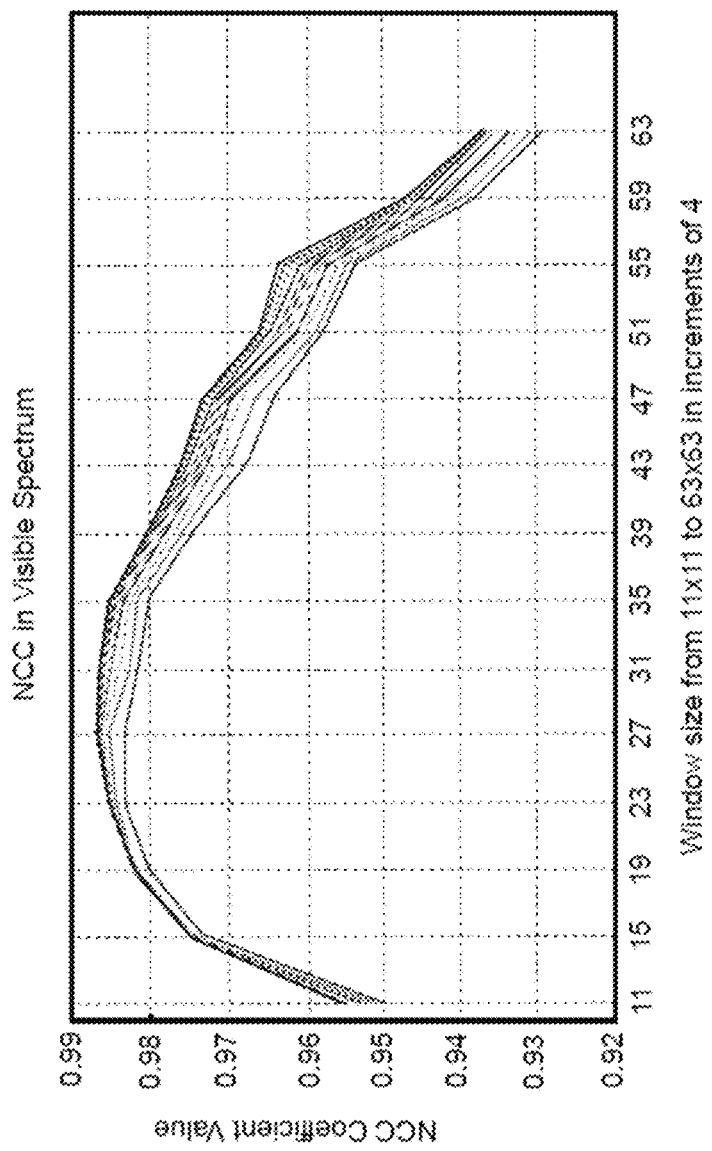
FIG. 12 illustrates NCC coefficient values as a function of template size in the visible region, according to an embodiment of the invention.

FIG. 12 illustrates the NCC coefficient values as a function of the template size in the visible spectrum. The peak NCC coefficient value occurs for a template size of 27×27, and then declines as the window size is increased.

Figure 13A:
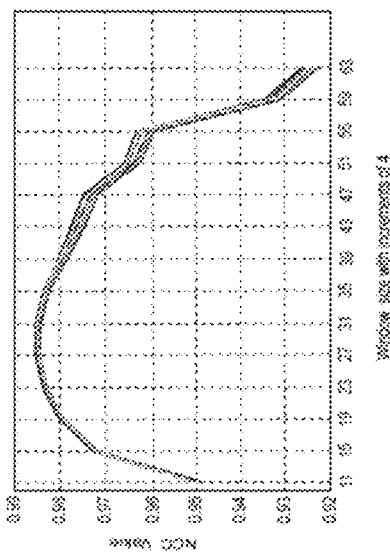
FIGS. 13A-13E illustrate NCC values as a function of sub-scene template size in the NIR spectrum, according to an embodiment of the invention.
Figure 13B:
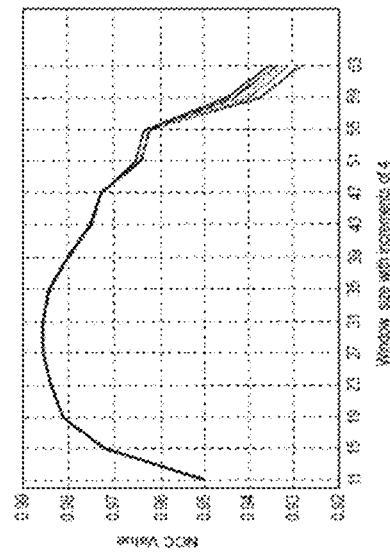
Figure 13C:
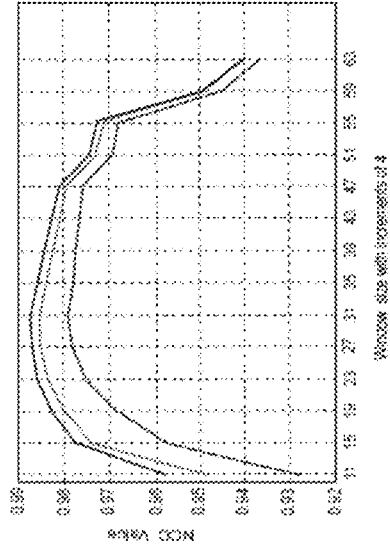
Figure 13D:
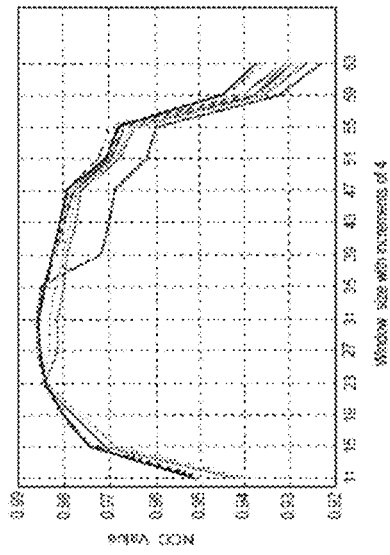
Figure 13E:
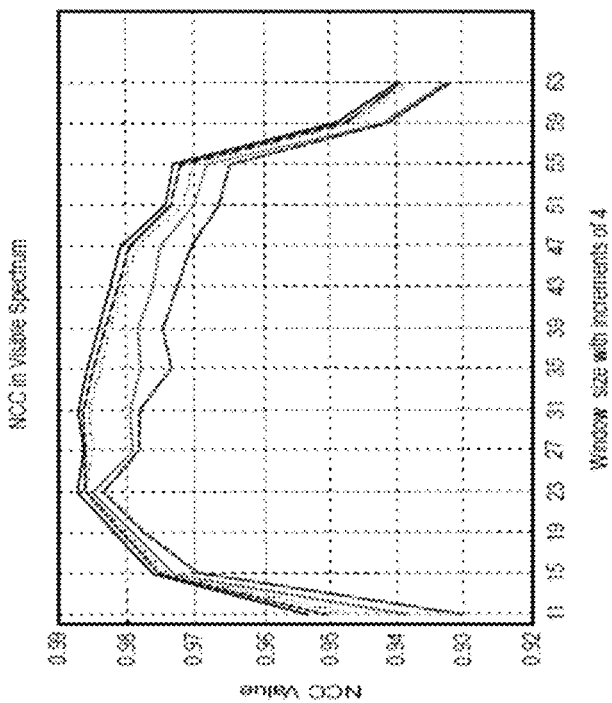

FIGS. 13A-13E illustrate NCC values as a function of the sub-scene template size in the NIR spectrum. The NIR spectrum contains 70 spectral bands, as illustrated in FIG. 13A (bands 1-14), FIG. 13B (bands 15-28), FIG. 13C (bands 29-42), FIG. 13D (bands 43-56), and FIG. 13E (bands 57-70). FIGS. 13A-13E illustrate the Normalized Cross Correlation coefficients peak values as a function of template sizes from 11×11 to 63×63 in increments of 4 pixels in rows and columns for the Near InfraRed (NIR) spectral region. As the number of bands in NIR is much larger than the visible range, 30 versus 70, the plots are divided into 5 sub-regions covering the NIR spectral region. The general shape of the peak NCC coefficients, as a function of template size, is similar in all five cases.

Figure 14A:
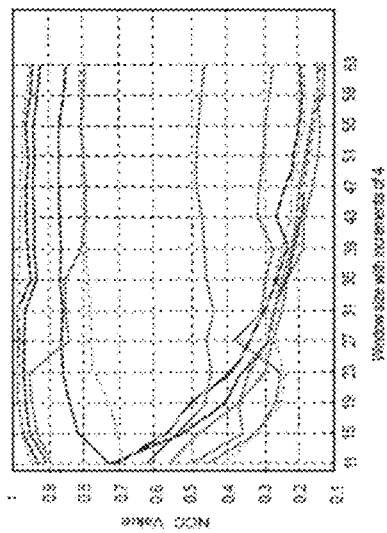
FIGS. 14A-14E illustrate NCC values as a function of sub-scene template size in the lowSWIR spectrum, according to an embodiment of the invention.
Figure 14B:
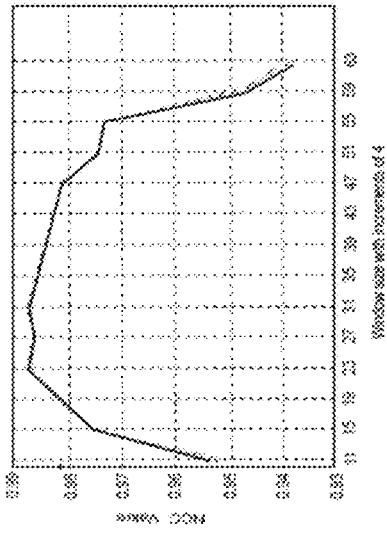
Figure 14C:
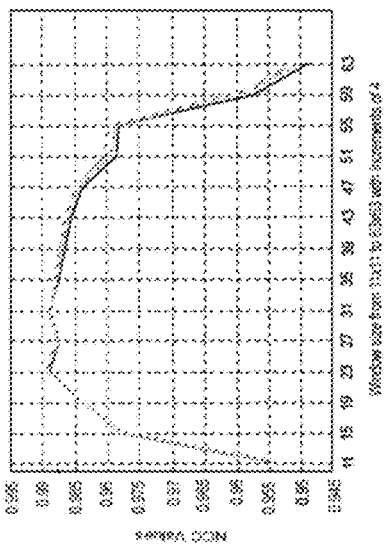
Figure 14D:
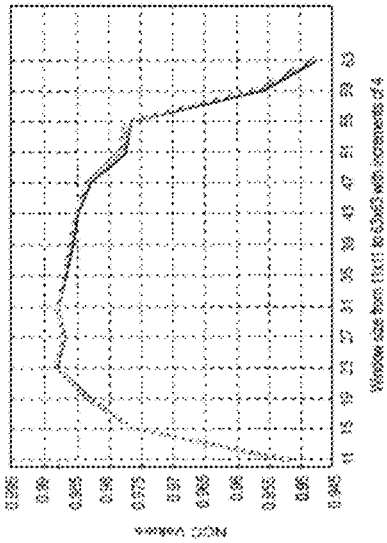
Figure 14E:
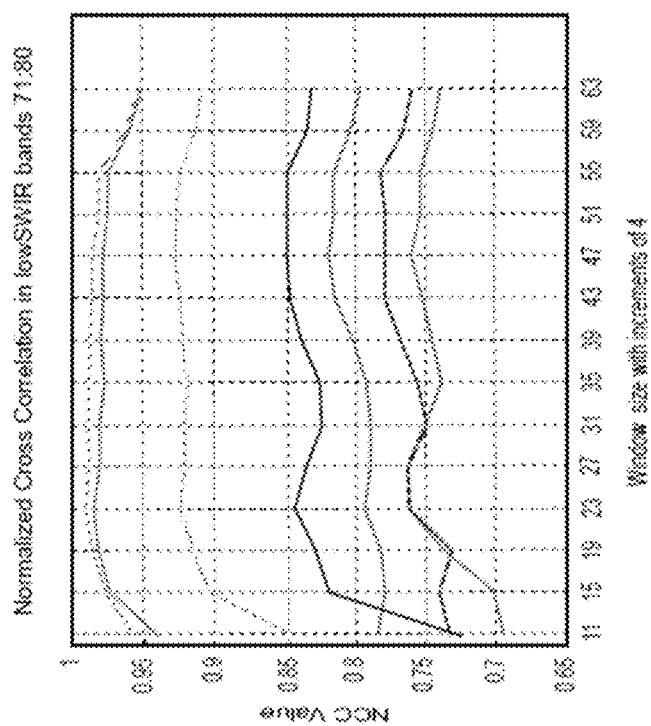

FIGS. 14A-14E illustrate NCC values as a function of sub-scene template size in the lowSWIR spectrum. The lowSWIR spectrum contains 80 spectral bands, as illustrated in FIG. 14A (bands 1-16), FIG. 14B (bands 17-42), FIG. 14C (bands 43-56), FIG. 14D (bands 57-70), and FIG. 14E (bands 71-80). FIGS. 14A-14E illustrate the Normalized Cross Correlation coefficients peak values as a function of template sizes from 11×11 to 63×63 in increments of 4 pixels in rows and columns for the low Short Wave Infra-Red (lowSWIR) spectral region. As the number of bands in lowSWIR is much larger than in the visible range, 30 versus 80, the plots are divided into 5 sub-regions covering the lowSWIR spectral region. The general shape of the peak NCC coefficients, as a function of template size, is similar with the exception of two cases: bands shown in FIGS. 14B and 14E are in the atmospheric absorption bands and have degraded performance.

Figure 15B:
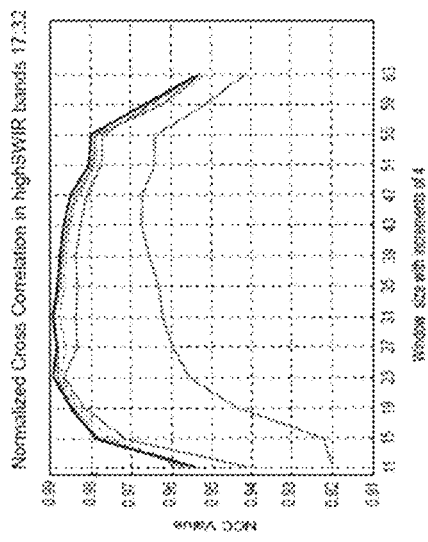
FIGS. 15A-15E illustrate NCC values as a function of sub-scene template size in the highSWIR spectrum, according to an embodiment of the invention.
Figure 15D:
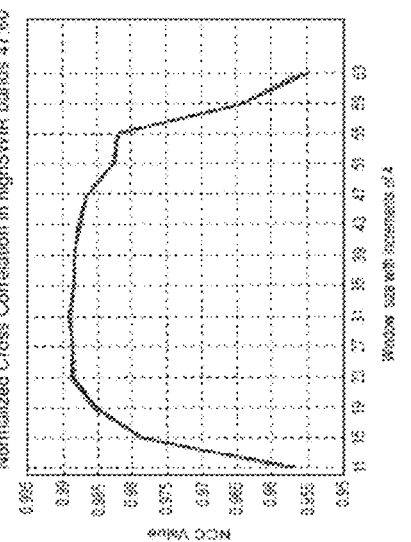
Figure 15A:
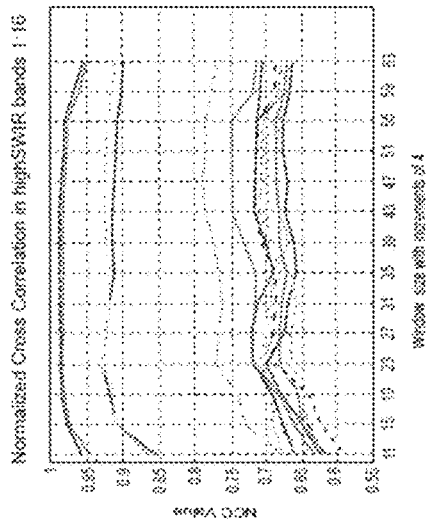
Figure 15C:
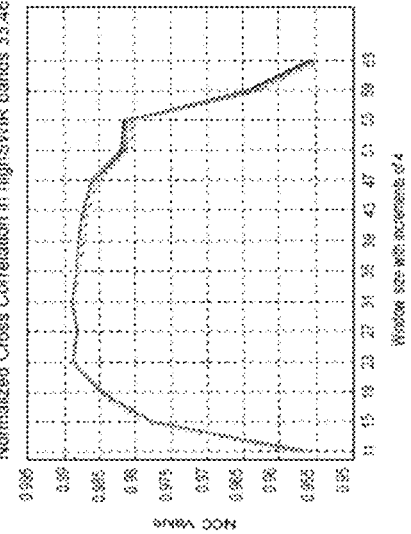
Figure 15E:
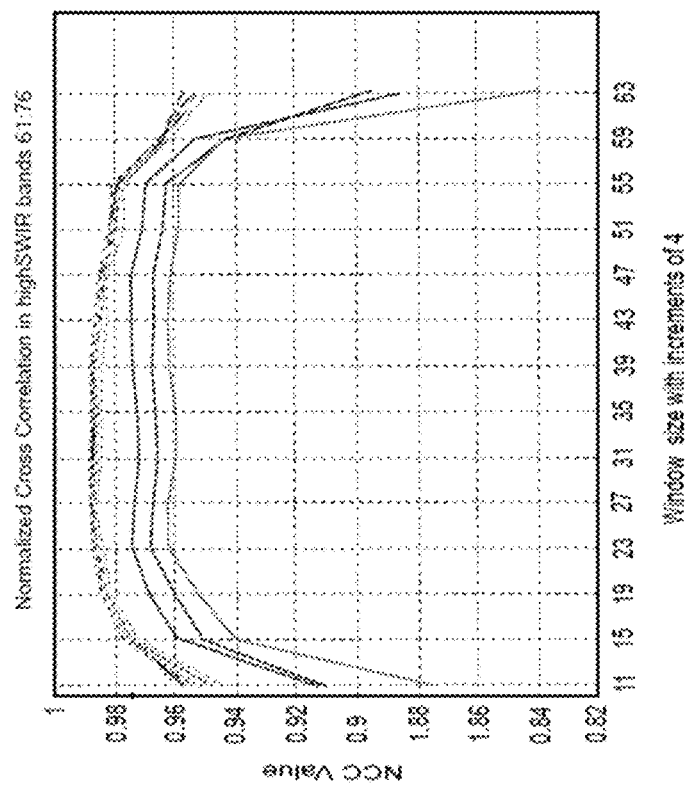

FIGS. 15A-15E illustrate NCC values as a function of sub-scene template size in the highSWIR spectrum which contains 80 spectral bands, FIG. 15A (bands 1-16), FIG. 15B (bands 17-32), FIG. 15C (bands 33-46), FIG. 15D (bands 47-60), and FIG. 15E (bands 61-76). FIGS. 15A-15E illustrate the Normalized Cross Correlation coefficients peak values as a function of template sizes from 11×11 to 63×63 in increments of 4 pixels in rows and columns for the high Short Wave Infra-Red (highSWIR) spectral region. As the number of bands in highSWIR is much larger than visible, 30 versus 80, the plots are divided into 5 sub-regions covering the highSWIR spectral region. As the noise increases due to hardware and spectral responses, the general shape of the peak NCC coefficients, as a function of template size, flattens out compared to the other spectral regions. Bands shown in FIG. 15A are affected by the atmospheric absorption bands. Bands in FIG. 15E have degraded performance but follow the overall shape of the curve.

It may be noted that as the template size increases the peak NCC coefficient values decrease in FIGS. 12-15E above. For data used in this work the precision increases with the template size; and the precision of template matching is not proportional to the peak NCC value that is determined using a smaller template. Depending on the size of the template, the smaller template does not produce a sufficiently sampled set of intensities. Furthermore, the peak NCC coefficient value does not always correspond to the optimum template match. Accordingly, there is a need for developing an approach to determine the correct template size.

Template Size Methodology

Figure 5D:
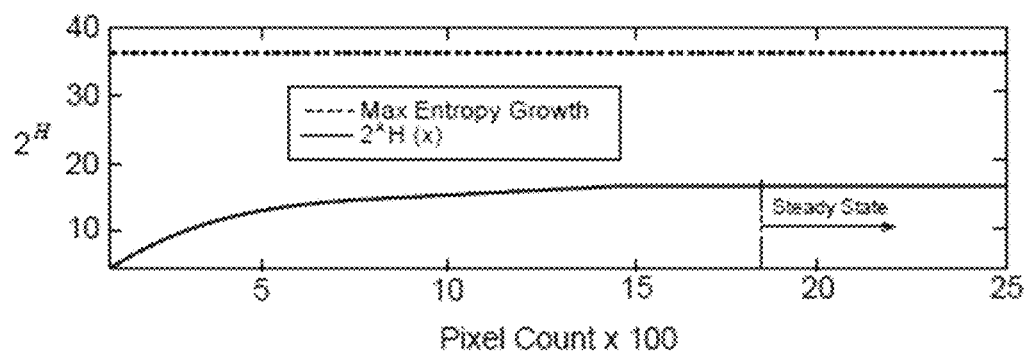

The template size is determined by two conditions. First, for computational ease an m×m template may be used, as depicted in FIGS. 5A-5B, with the parameter 'm' being a power of 2. Second, as illustrated in FIG. 5C, the phase transition approach may be used for a sufficiently sampled data set by calculating the maximum possible entropic states and actual entropic states as number of the pixels. FIG. 5D illustrates the maximum possible levels of entropy or the maximum typical set based on uniformly distributed pixel amplitudes within the image. FIGS. 5C-5D also depict the actual level of entropy H(x) and 2H as a function of the number of the pixels (m×m). The typical set represented by 2H depends on H(x), where H(x) is the discrete entropy associated with the image. The maximum typical data set is based on uniformly distributed pixel amplitudes within the image.

Adequate sampling of entropic estimates is demonstrated in FIGS. 5C-5D using a phase transition plot of the image with a typical set as a function of pixel count within a fixed image area. This ensures that the angles of rotation and translation estimate uncertainty characterizations are void of sample uncertainty. For this specific case, as the numbers of pixels exceed 2000 count (see FIG. 5C), there is a sufficiently sampled set. A template of 32 by 32 will provide only 1024 pixels, so we select the next size template 64 by 64 which provides 4096 pixels, and ensures a sufficiently sample set.

Location of the template 200 should be chosen carefully, to ensure maximum possibility that a matching template will result in the unregistered image 142 that has been rotated and translated. The template region is selected in the rightmost side of the reference image 140 as illustrated in FIG. 5A, starting at approximately the 25 percent point for the number of rows, and extending to the 75 percent of the number of rows in the image 140. This approach is selected because the rotation of the unregistered image 142 may cause the top or the bottom corner of the unregistered image 142 to be completely eliminated from the scene. Therefore a template of that region from the reference image may not have any significant normalized cross correlation (NCC) value at or near a match in the unregistered image 142.

FIG. 5A illustrates the template region that starts at the 25 percent point for a number of rows, and extending to the 75 percent point for a number of rows in the reference image 140. This template region may be covered by multiple overlapping templates 200 of the same size. Equivalent templates corresponding to the reference templates may then be determined by employing a similarity measure in the unregistered image 142, forming the corresponding template region in the unregistered image 142. The template region may provide multiple values for image orientation and translation which may help to mitigate these calculations in the presence of noise.

The starting and ending points at the 25 percent point and the 75 percent point of the number of rows may be dictated by rotation which may be present in the images to be registered 142. The possible rotation may be derived from requirements of the collection platform (manned or unmanned) or may be an arbitrary value. Either way, care should be taken in determining the template region for registration. Depending on the aircraft, aerodynamic drag, location of the sensor on the airframe, and many other factors may affect yaw and roll conditions of an aircraft, and may cause a change in the orientation of images captured. This may be a small number as the aircraft is flying in a straight line but should be compensated for. In another example is when the aircraft is flying in a circular pattern and not a straight line. In this case there will be rotation present between the images as there is finite amount of time required to capture and process the image before moving on to capture the next image.

Normalized Cross Correlation

For intensity-based images that are gray-scale, a matched filters approach, or correlation-based matching may be used. Normalized Cross Correlation (NCC) is found to provide robustness against gray-scale degradation. In addition, the theory of definite canonicalization provides theoretical proof that normalized cross correlation has a high immunity against image blurring and degradation.

For template matching, a patch or a sub-scene template may be defined in the right side of the reference image 140 and a search may be conducted in the input image or the unregistered image 142. The search is conducted pixel-by-pixel, which determines a correlation coefficient matrix for all the pixel values using the following relation in equation 2-6:

$$\gamma(i, j) = \frac{\sum\sum_{x\,y}(I_1(x, y) - \overline{I_1}) * (I_2(x - \iota, y - f) - \overline{I_2})}{\sqrt{\sum\sum_{x\,y}(I_1(x, y) - \overline{I_1})^2} * \sqrt{\sum\sum_{x\,y}(I_2(x - i, y - j) - \overline{I_2})^2}} \quad (2\text{-}6)$$

Here, i and j are the indices from 1 to N for an N by N unregistered image. The location of the template in unregistered image is represented by (i,j). N by N is the number of pixels in the unregistered image, with N rows and N columns. $I_1$ represents the template intensity values in the reference image is the image, and $\bar{I}_1$ is the mean of the image in the template neighborhood.

$I_2$ is the template, and $\bar{I}_2$ is the mean intensity value of the template defined as $$\bar{I}_2 = \frac{1}{M} \sum_{x=1,y=1}^{m,m} \bar{I}_2(x,y) \text{ where } M = m*m \qquad (7)$$

$\gamma(i,j)$ may be used to construct the NCC (Normalized Cross Correlation) matrix. The value of $\gamma(i,j)$ may be calculated for every pixel comparison with the template. For a perfect match, under ideal conditions, the coefficient $\gamma(i,j)=1$.

Reference Template Location

The template region may be selected in the rightmost side of the reference image 140, starting at approximately the 25 percent point for the number of rows, and extending to the 75 percent point of the number of rows in the image and is defined as the valid window space, as explained above with regard to FIGS. 5A-5B. For a reference image $I1_{ixj}$ of size i rows by j columns, the right side may be used to designate templates to determine the overlap. The template 200 may be aligned with the right side of the reference image 140. The size of the template 200 is a constant m×m. There may be multiple templates 200, each differing in location by the template moving from 25 percent height to 75 percent of maximum row count.

Each reference template 200 may then be used to match a template equivalent location (m×m) in the unregistered image 142 $I2_{ixj}$. This process may involve moving the reference template 200 pixel-by-pixel through the entire unregistered image 142 $I2_{ixj}$ and calculating normalized cross correlation. The bottom right coordinate of the reference template may be matched to the bottom right corner of the unregistered template, which may determine the translation between the reference image 140 and the unregistered image 142.

Figures 16A, 16B:
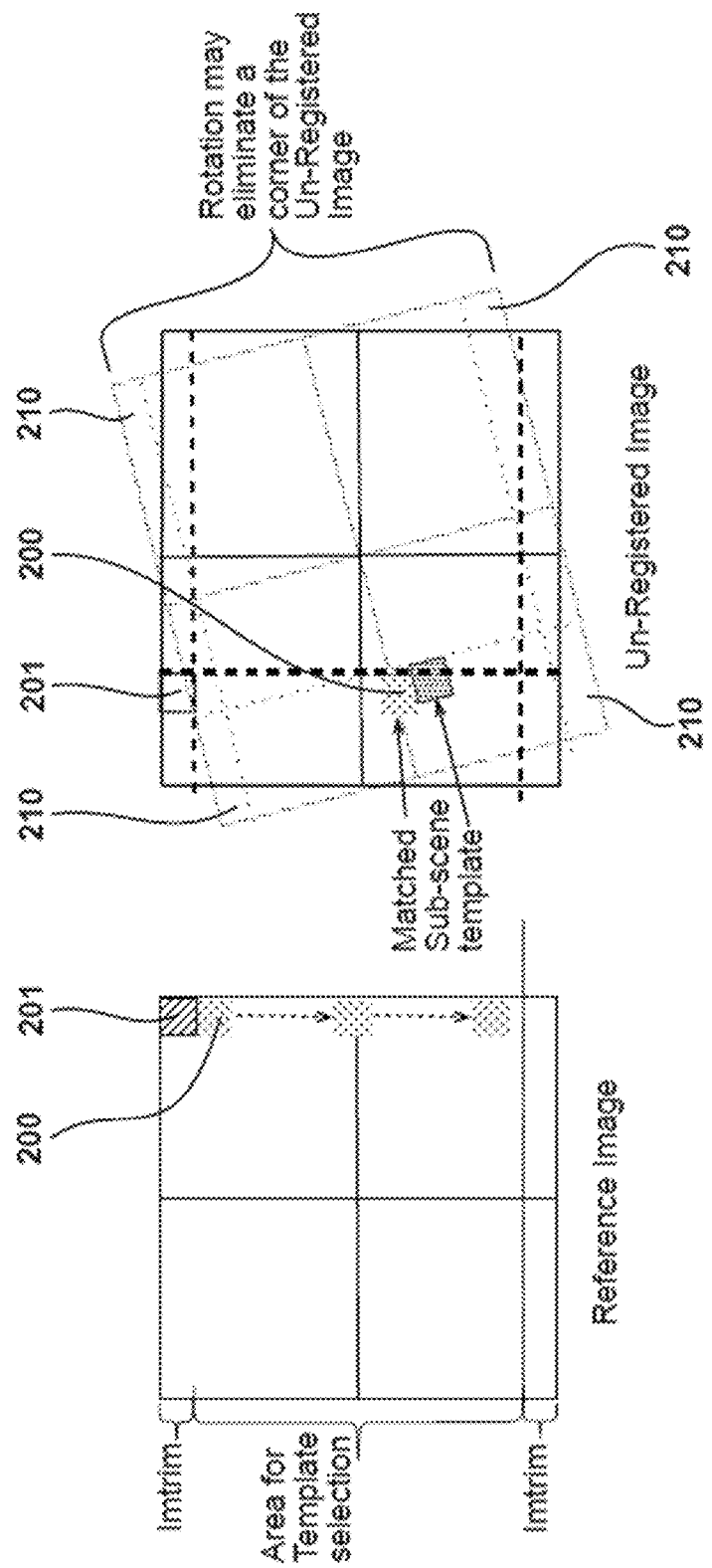
FIGS. 16A-16B illustrate the effect of rotation on the position of a corresponding template in the unregistered image, according to an embodiment of the invention.

This approach may be selected because the rotation of the unregistered image 142 may cause the top corner or the bottom corner of the unregistered image 142 to be completely eliminated from the scene 210, as illustrated in FIGS. 16A-16B. Therefore, a template 200 in that region 210 from the reference image may never have any significant NCC coefficient value or a near-match in the unregistered image 142. This phenomenon is illustrated in FIGS. 16A-16B, where the upper template 200 in the reference image 140 is not covered by the unregistered image 142, due to rotation shown by the light grey area representing the area covered by the unregistered image 142. The area inside the black line of FIG. 16B represents the field of view if there was no rotation present in the unregistered image.

The Registration Method

The registration method consists of three stages, i.e. wide angle estimation, coarse angle estimation, and fine angle estimation. Output of the first stage goes into the second stage and the output of the second stage into the third stage. This method is started with pre-processing and the associated tools. A brief overview was presented above, regarding wavelets as applied to preprocessing, effects of noise, and template selection methodology.

Wide Angle Estimation

The guided area search using NCC is performed in three stages (see FIGS. 1A-1B):

i) Wide angle approximation and search space reduction.
ii) Coarse angle estimation and mutual information calculation.
iii) Fine angle estimation.

For wide angle estimation (see FIGS. 16C-16D), the input or unregistered template may be rotated from negative a-priori given angle $-\theta R$ to $\theta R$ (FIG. 16C) with increments of a constant interval of a degrees to assess the wide angle approximation. The interval $\alpha$ may be a constant dependent on angle of rotation, as explained in the next section, such that the interval $2\theta R$ is an integer multiple of $\alpha$. This process may be repeated sequentially for multiple overlapping templates and an angle vector may be constructed therefrom. For n templates in the reference image 140 and respective n templates in the unregistered image 142, an equal number of angles of rotation may be calculated.

Let: $\vec{\Psi}$ be the angle vector comprised of n angles calculated by n template matches. Then $$\vec{\Psi} = [\vec{\Psi}_1, \vec{\Psi}_2, \vec{\Psi}_3, \ldots \vec{\Psi}_n] \qquad (8)$$

$$\theta_{WA} = Mo(\vec{\Psi}) \qquad (9)$$

FIGS. 16A-16D illustrate the angle space rotated by 90° for convenience. Other angles may be utilized. The solid line, i.e. the arc on either side of $\theta_{WA}$ shows the calculated wide angle approximation. The wide angle approximation $\theta_{WA}$ is the mode of the angle vector. The probability of image orientation for wide angle approximation is the angle $\theta_{WA} \pm (\alpha-1)$ degrees. The same methodology may be applied to calculate translation in the image by first calculating $x_{wa}$ and $y_{wa}$ and then determining the difference by comparison to the reference template location. The equations below represent all possible X & Y coordinate locations. The algorithm is looking for values that repeat the most. The equations 10 & 11 represent all possible X & Y coordinate locations, equations 12 & 13 represent the mode of those locations.

$$\vec{X}_{wa} = [x_{wa1}, x_{wa2}, \ldots x_{wan}] \qquad (10)$$

$$\vec{Y}_{wa} = [y_{wa1}, y_{wa2}, \ldots y_{wan}] \qquad (11)$$

$$x_{wa} = Mo(\vec{X}_{wa}) \qquad (12)$$

$$y_{wa} = Mo(\vec{Y}_{wa}) \qquad (13)$$

Once the wide angle orientation and translation is determined, it provides a rough idea of the vicinity of these parameters. The next step before going to coarse angle calculations is the reduction of search space.

Search Space Reduction

Figures 16C, 16D:
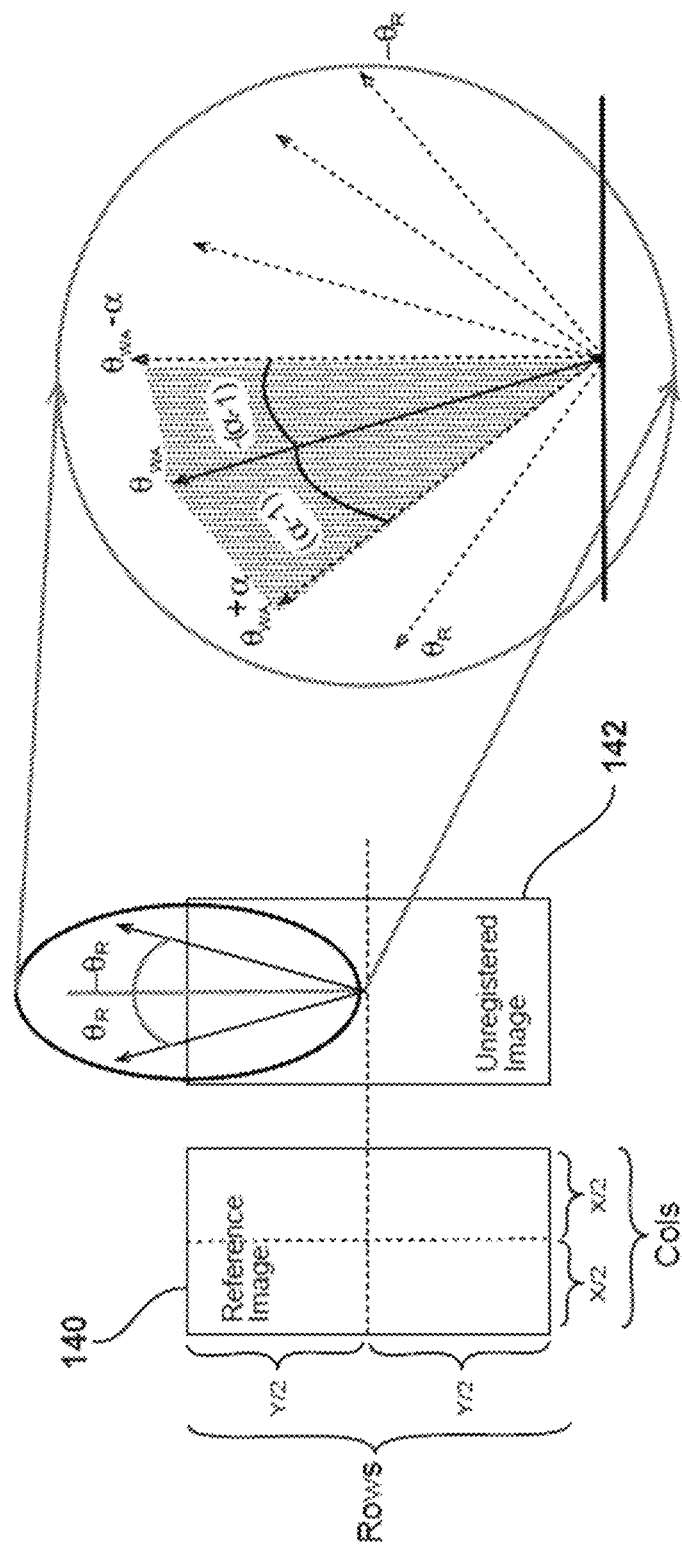
FIGS. 16C-16D illustrate possible angles of rotation for the unregistered image for wide angle approximation, according to an embodiment of the invention.

For algorithmic requirements, e.g. boundary conditions, how much rotation is possible and in what direction, CW or CCW, the rotation was at ±20°. Let R be the angular range in general and defined as $$R = \{-\theta_R, \theta_1, \theta_2, \ldots, \theta, \ldots, \theta_{n-2}, \theta_{n-1}, \theta_n = \theta_R\} \qquad (14)$$

Where $\theta n = \theta_{n-1} + \alpha$, here $\alpha$ may be a constant dependent on the angle of rotation, such that the interval $2\theta R$ is an integer multiple of $\alpha$ as shown in FIG. 16C. In FIG. 16D, the possible angles lie between $\theta R$ and negative $\theta R$; $\alpha$ is added to move to the next vector position.

The search space for template matching is the unregistered image 142. This implies that the template 200 has to be moved pixel by pixel and the NCC coefficient values calculated for each position. This approach was implemented above for the wide angle estimation process. However, once the wide angle is determined and the translation values calculated, the search space reduction can be determined.

The overlapped area (the shaded area of FIG. 18) is determined by sub-scene template matching using Equation 15. Given $\theta_{WA}$ the wide angle of rotation, the margin, e.g. the number of rows calculated by equation 15, can be calculated as $$\text{Margin} = \tan \theta * y/2 \qquad (15)$$

Figure 17:
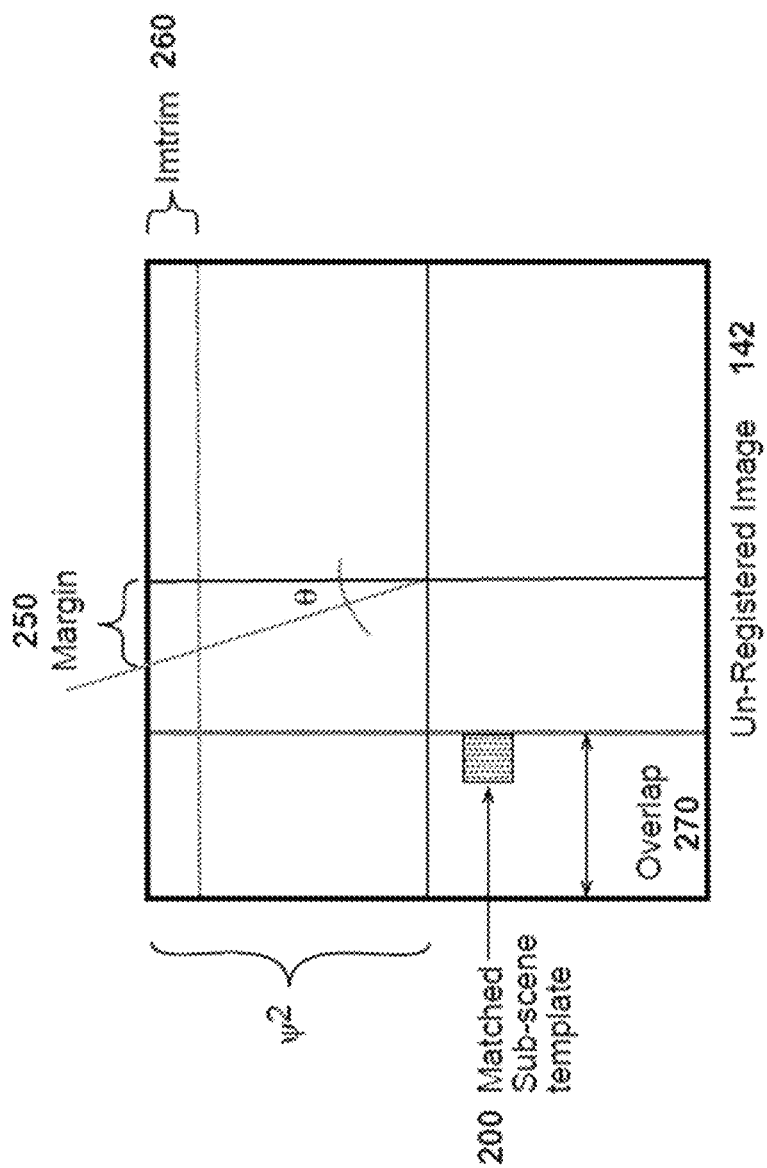
FIG. 17 illustrates parameters for search space reduction developed in the wide angle estimation stage, according to an embodiment of the invention.
Figure 18:
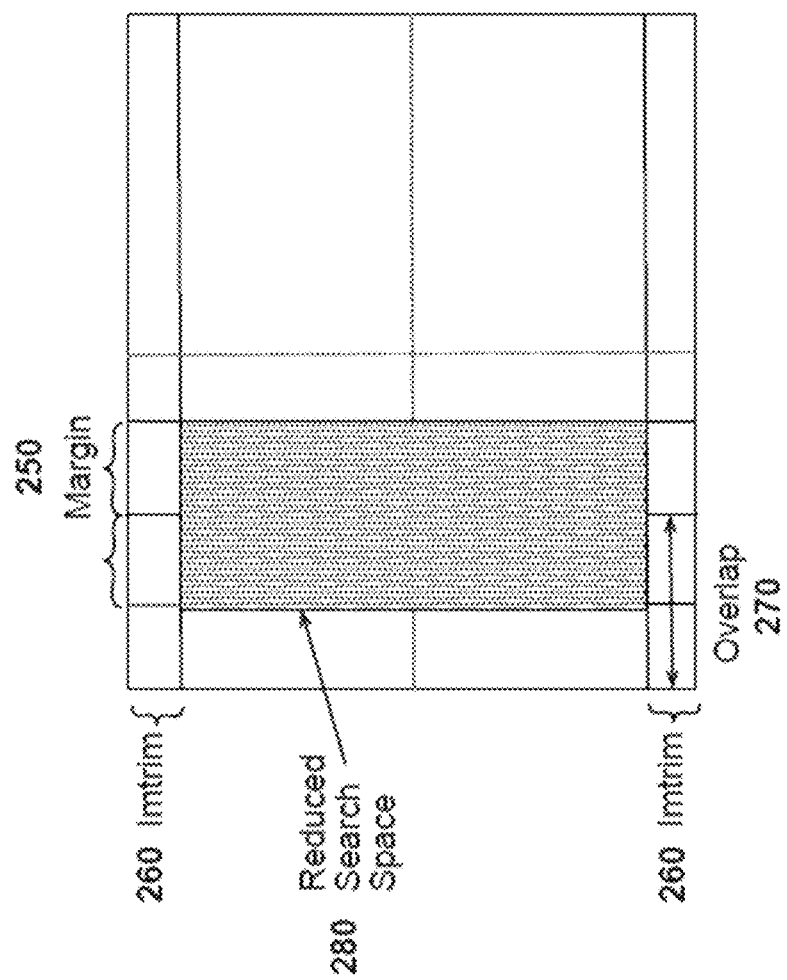
FIG. 18 illustrates a reduced search space (shaded area) for template matching in the unregistered image, according to an embodiment of the invention.

Imtrim, as illustrated in FIG. 17, is the number of rows of pixels (x=number of rows, y=number of columns, tangent θ=rows/columns) that are excluded from being part of the valid template matching region and may be set at 25% of the number of rows (nominal value from the problem conditions) to avoid the predicament illustrated in FIG. 16B. That is, FIG. 16B illustrates the rotated scene in the field of view of an unregistered image. An equivalent template from the top right corner of the reference image will be missing in the unregistered image due to rotation. The three parameters required for determining the reduced search space are then Margin 250, Imtrim 260, and the overlap 270. FIG. 18 illustrates the location of these parameters on the unregistered image 142.

Utilizing these three parameters, the search space may be reduced from the entire unregistered image 142 to a sub-section of the unregistered image 280 as shown by the shaded portion 280 in FIG. 18. Since area-based methods depend on pixel-by-pixel operations, a reduction in search space or pixel count significantly impacts the computational cost. The reduced search space coordinates may then be passed along with the wide angle estimation $\theta_{WA}$, which is the mode of the angle vector, i.e. the algorithm is looking for values that repeat the most, to the next stage of the algorithm for a coarse angle calculation. The search space reduction may be employed in both the coarse angle and fine angle calculation stages, significantly reducing the number of calculations. For coarse and fine angle stages, the number of calculations may be reduced by a factor of 10. The reduction in calculations is directly proportional to size of the image and inversely proportional to the angle of rotation between the two images. In the following section, variation of information is presented which is an Information Theoretic metric employed for registration later on.

Information Theoretic Measures

Coarse and fine angle estimation comprise the second and third stages of the proposed method, as depicted in FIGS. 1A-1B. Both of these stages may employ search space reduction to reduce the number of calculations and employ, in addition to NCC, a second similarity measure, i.e. Mutual information based variation of information.

Information theoretic measures such as mutual information and variation of information may come into play in the second and third stages of the algorithm. These concepts are explained in this section detailing the coarse and fine angle estimation stages. Equations 18 and 19, below, explain mutual information and variation of information. In order to use variation of information, mutual information should be calculated. Information theory system prototypes enable the study of the propagating effects of various sources of uncertainty on registration performance at the point of noise infiltration. An information theoretic measure yields a unique solution which is the maximum value for the Mutual Information (MI) configuration, and the minimum value for the variation of information. Mutual Information is one of many quantities that measures how much one random variable tells us about another variable. MI is a dimensionless quantity and can be thought of as the reduction in uncertainty about one random variable given knowledge of another. High mutual information indicates a large reduction in uncertainty; low mutual information indicates a small reduction; and zero mutual information between two random variables means the variables are independent.

The entropy of a random variable I is defined as $$H(I) = -\Sigma_i p(i) \log_2 p(i) \qquad (16)$$

where p(i) is the probability mass function of the random variable 'I'. In our case 'I' is the image and "i" represents the intensities in the image. $I_1$ and $I_2$ are discrete random variables; you need to have 2 random variables to calculate mutual information. The entropy of I1 given I2 is defined as:

$$H(I_1|I_2) = H(I_1, I_2) - H(I_2) \qquad (17)$$

Mutual Information (MI) in terms of entropy is defined as:

$$MI(I_1, I_2) = H(I_1) + H(I_2) - H(I_1, I_2) \qquad (18)$$

where $I_1$ and $I_2$ are discrete random variables, $H(I_1)$ and $H(I_2)$ are marginal entropies, and $H(I_1, I_2)$ defines the joint entropy. The MI may provide a measure of statistical dependence that exists between $I_1$ and $I_2$.

The variation of information p affords valuable properties of a metric in providing the measure of statistical distance between two images. Statistical distance is the difference between two random variables x and y; if the distance d=0, then x=y. It is defined mathematically as:

$$\rho(I_1, I_2) = H(I_1) + H(I_2) - 2MI(I_1, I_2) \qquad (19)$$

$H(I_1)$ and $H(I_2)$ are marginal entropies that can be calculated from Equation 16, and the mutual information is calculated from Equation 18.

Figure 20:
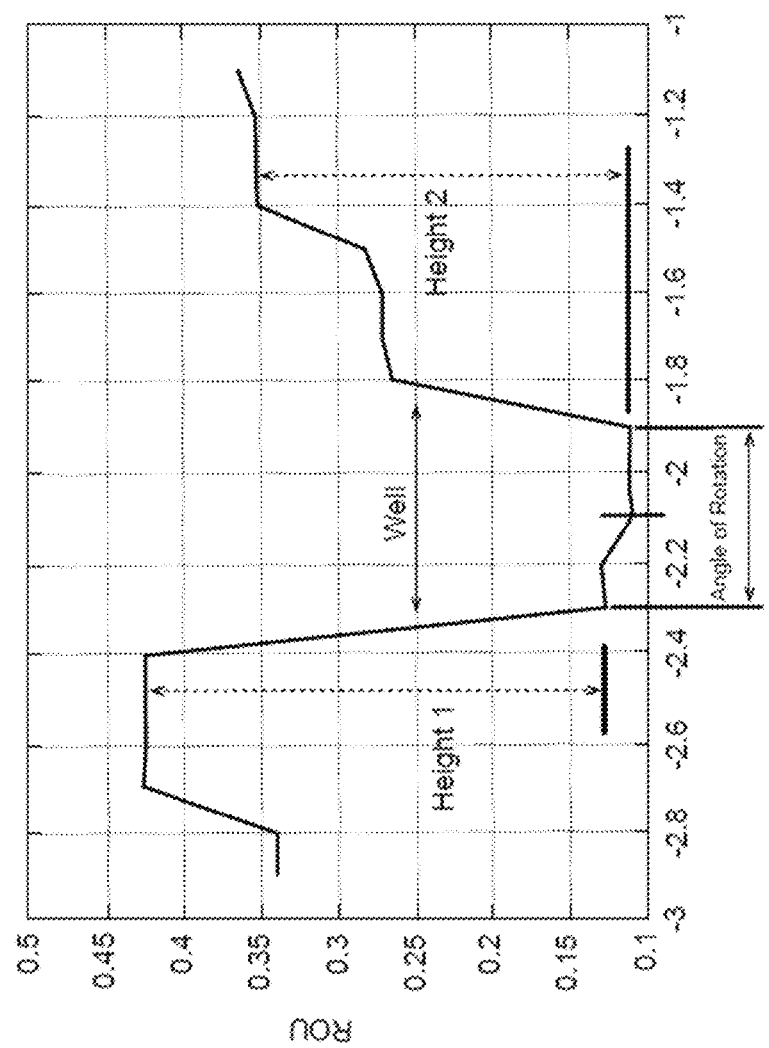
FIG. 20 illustrates Variation of Information (VI) for various orientations of and unregistered image for alignment with a reference image, according to an embodiment of the invention.

For the template matching approach, the coarse and fine angle calculations may depend on the image size, and the direction of rotation. This may result in more than one possible solution when using similarity measures. This effect can be seen in the case where convexity of the solution appears more like a flat line with more than one point at the peak or clustering of the points near the peak. Entropy and Mutual Information present an efficient technique for automated registration of partially overlapped aerial imagery that uses variation of information. They provide a distinguished and unique solution, when possible (it may not be possible if there is too much noise and there is degradation of the image, e.g. SNR less than 4 dBs), where there is more than one solution (fine angular alignment). The possible solutions determined are shown with emphasis on the most likely solution will be determined. FIG. 20 illustrates the "well" with possible solutions and a dip in the floor of the "well" at −2.3 degrees. Operationally, one of the most demanding aspects is the effects of System Uncertainty on the data collected, and ultimately, the degradation of algorithmic performance for processing the data. As such the system level noise models were developed, and injected into both the reference 140 and unregistered 142 images to evaluate the performance of the above approach as a function of signal to noise ratio (SNR).

Figure 19:
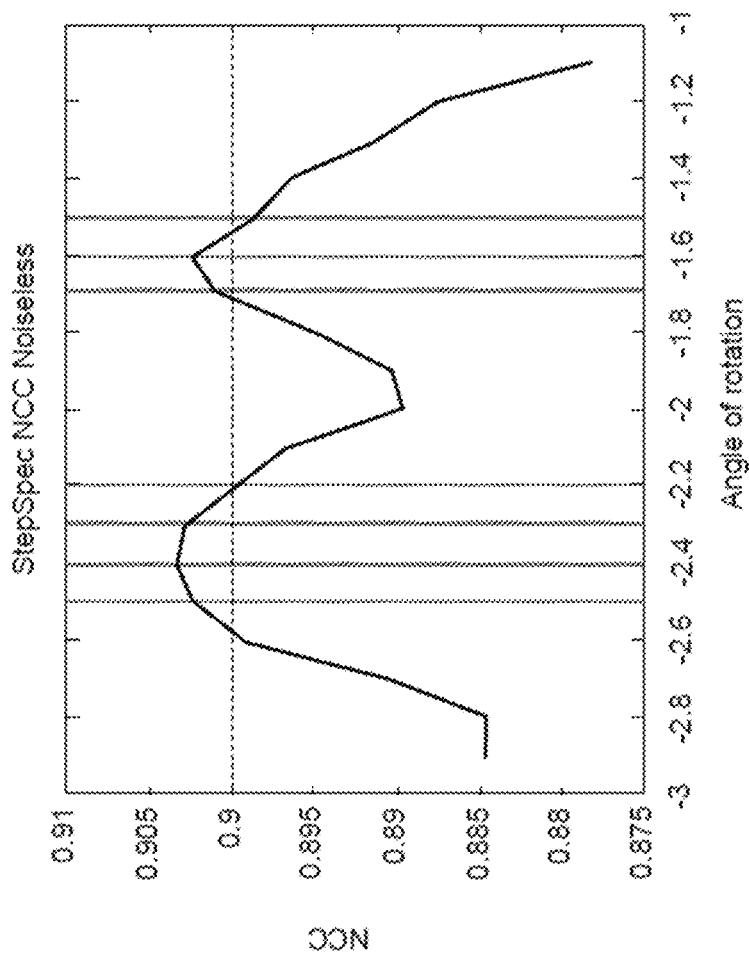
FIG. 19 illustrates NCC values generated as a function of image orientation for fine angle rotation, according to an embodiment of the invention.

FIG. 19 illustrates the NCC values as a function of a very fine rotation. In this case the convexity of the solution no longer exists to yield a single solution. Instead if we apply a threshold technique to collect multiple values of NCC, the result is two different sets of angular values for the fine angle of rotation as can be seen in FIG. 19. Threshold applied to variation of information can also lead to more than one solution. However, the multiple angular values in the solution will be in one group. FIG. 20 illustrates the behavior of "ρ", which represents the variation of information, as a function of angle of rotation in increments of 0.1 degrees.

The "well" indicates the possible angles of rotation for the specific instance with a notch at −2.1 degrees indicating the most optimum angular orientation. Height 1 and Height 2 are the walls of the well showing separation from other "ρ" metric values.

Coarse and Fine Angle Estimation

Figure 21:
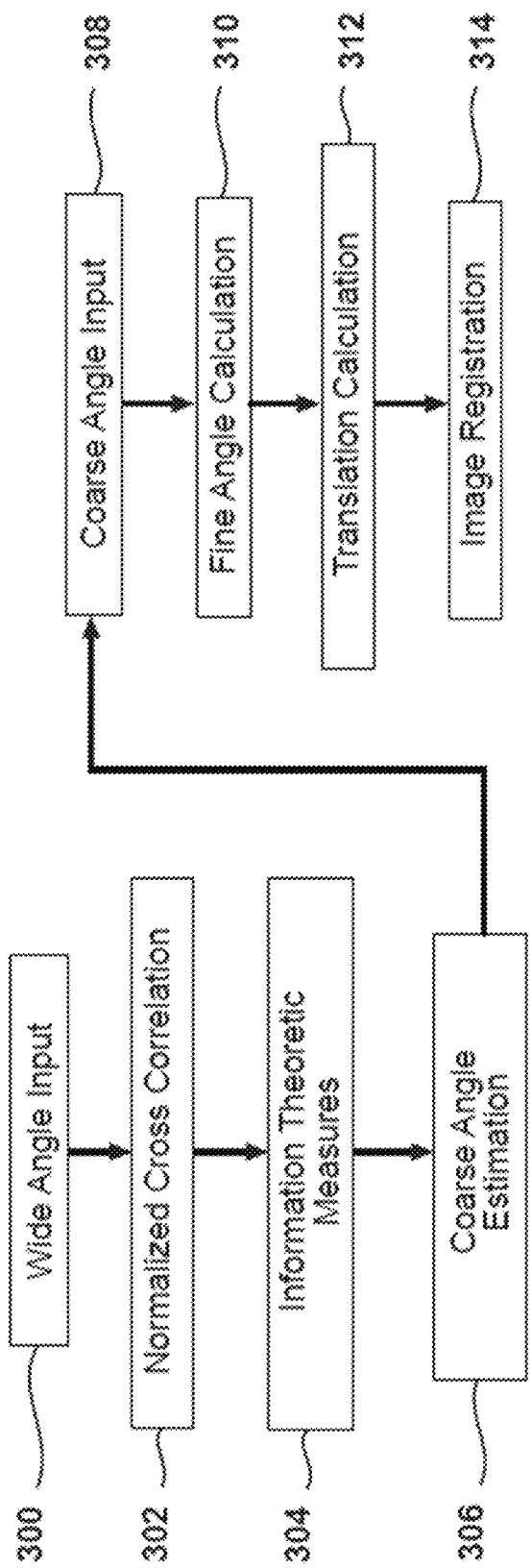
FIG. 21 illustrates coarse and fine angle estimation stages utilizing both normalized cross correlation (NCC) and information theoretic measures for determining registration parameters, according to an embodiment of the invention.

FIG. 21 illustrates a high level block diagram for both the coarse and fine angle estimation stages. The process starts with a wide angle input 300 and the application of normalized cross correlation 302 and information theoretic measures 304 to achieve a coarse angle estimation 306. The coarse angle $\theta_{CA}$ may approximate the image orientation within ±1 degree. This may be done by utilizing multiple overlapping templates 200 covering the far right edge of the reference image 140. These templates 200 may then be concatenated to produce a single window for MI calculation. The coarse angle $\theta_{CA}$ estimation may then be validated by using information theoretic measures. Mutual Information may come into play for coarse angle estimation, as at this point an angular range has been determined to be targeted for the image angle of rotation. In this case both the measure MI and the measure ρ, as given by Equation 19, may be calculated to identify the angle of rotation within ±1 degree. The coarse angle range may now be defined in terms of the wide angle as $$\theta_{CA}=(\theta_{WA}\pm(\alpha-1))° \quad (20)$$

For coarse angle estimation 306 the rotation search may span from $\theta_{WA}-(\alpha-1)$ as the starting point to $\theta_{WA}+(\alpha-1)$ as the final orientation (see FIG. 16D). The overlay plus the margin may provide the reduced search space for normalized cross correlation.

Once the coarse angle $\theta_{CA}$ value is determined and input 308, the fine angle range may be defined in terms of the coarse angle as $$\theta_{FA}=(\theta_{CA}\pm 0.9)° \quad (21)$$

The fine angle estimation step calculations may be done in increments of 0.1 degrees, resulting in the calculation of the fine angle of rotation 310. In both the coarse angle and fine angle cases, multiple overlapping templates may be employed within the reduced search space to construct a vector of resultant angular values for each case, and then the mode of the angle vector determines the image orientation. To augment the approach using normalized cross correlation, information theoretic measures may be employed in both coarse and fine angle estimation.

In the fine angle estimation stage, the angle and translation parameters are calculated 312. These parameters may then be applied to the reference 140 and unregistered 142 image, completing the registration process 314.

The pseudo-code of stage 1, the wide angle estimation stage, is presented below. Pre-processing, filtering, and correlation based techniques, already explained in previous sections, are used in this portion of the algorithm. The output of this stage is the wide angle estimation using normalized cross correlation as a similarity measure, and the reduced search space coordinates which are then passed to stage 2, the coarse angle estimation.

Step 1. Perform 2-D convolution of the cubic spline wavelet with both $I1_{M \times N}$ and $I2_{M \times N}$ for noise reduction and edge detection while maintaining grey level intensities $$(I1*\psi)(x,y)=\Sigma\Sigma I(x-u,y-v)\psi(u,v)$$

$$(I2*\psi)(x,y)=\Sigma\tau I(x-u,y-v)\psi(u,v)$$

Step 2. Assign wide angle range as follows:

$$R=\{-\theta_R,\theta_1,\theta_2,\ldots,\theta,\ldots,\theta_{n-2},\theta_{n-1},\theta_n=\theta_R\} \quad (14)$$

Where $\theta_n=\theta_{n-1}+\alpha$, here α is a constant dependent on angle of rotation, such that the interval $2\theta_R$ is an integer multiple of α.

Step 3. Execute template matching using Normalized Cross Correlation

Define template $T_{ref}$ in the reference image for i=1 to M for j=1 to N

Calculate NCC coefficients end end

Save maximum NCC value and the corresponding orientation and translation parameters Step 4. Repeat step 3 for all templates in the valid template region of the reference image and find corresponding matches in the unregistered image.

Step 5. Repeat step 4 to determine γ(i,j) for all wide angular values in the angle range for the unregistered image. The maximum value across all orientations provides possible wide angle estimation and translation parameters.

Step 6. Based on the image height or rows in an image the margin for maximum image overlap can be calculated, for a given angle φ in the above mentioned set R, as margin= (rows/2)*tan φ

Step 7: The wide angle overlap plus the margin provides the reduced search space for the next stage.

The algorithmic steps of stage 2, the coarse angle estimation stage, are presented below. Stage 2 employs the wide angle, as the starting point, for narrowing down the image orientation along with the search space reduction parameters to expedite the calculations. The angular search space is also reduced as a result of the calculations made in the first stage. Stage 2 utilizes information theoretic measures along with correlation to pinpoint the image orientation.

Step 1. Set the unregistered image orientation at the values provided by the previous stage for coarse angle calculation with $\theta_{WA}-(\alpha-1)$ as the starting point to $\theta_{WA}+(\alpha-1)$ as the final orientation.

Step 2. Execute template matching using Normalized Cross Correlation

Define template $T_{ref}$ in the reference image

Define m, n, M' and N' in the unregistered image $I2_{M \times N}$ employing the search space reduction parameters for i=m to M' for j=n to N'

Calculate NCC coefficients end end

Save maximum NCC value and the corresponding orientation and translation parameters Step 3. Repeat step 2 for all templates in the valid template region of the reference image and find corresponding matches in the unregistered image.

Step 4. Apply variation of information to determine the optimum match from the values calculated in the previous step Step 5. Repeat step 3 to determine γ(i,j) for all coarse angular values in the angle range for the unregistered image. The maximum value across all orientations provides possible wide angle estimation and translation parameters.

The step-by-step procedure for Stage 3, the fine angle estimation stage, is presented below. The angular output of stage 2 is used as the starting point for fine angle estimation. Stage 3 repeats the calculations in stage 2 but with a finer angular range. Although the angular range is reduced compared to the first two stages, Stage 3 utilizes an increased number of image orientations to calculate the fine angle. In addition, this stage also determines the final translation parameters before registering the two images.

Step 1. Set the unregistered image orientation at the values provided by the previous stage for fine angle calculation with ($\theta_{CA}$-0.9) as the starting point to ($\theta_{CA}$+0.9) as the final orientation.

Step 2. Execute template matching using Normalized Cross Correlation

Define template $T_{ref}$ in the reference image
Define m, n, M' and N' in the unregistered image $I2_{M \times N}$ employing the search space reduction parameters
for i=m to M'
for j=n to N'
Calculate NCC coefficients
end
end Save maximum NCC value and the corresponding orientation and translation parameters Step 3. Repeat step 2 for all templates in the valid template region of the reference image and find corresponding matches in the unregistered image.

Step 4. Apply variation of information to determine the optimum match from the values calculated in the previous step Step 5. Repeat step 3 to determine $\gamma(i,j)$ for all fine angular values in the angle range for the unregistered image. The maximum value across all orientations provides possible wide angle estimation and translation parameters.

Figures 22A, 22B:
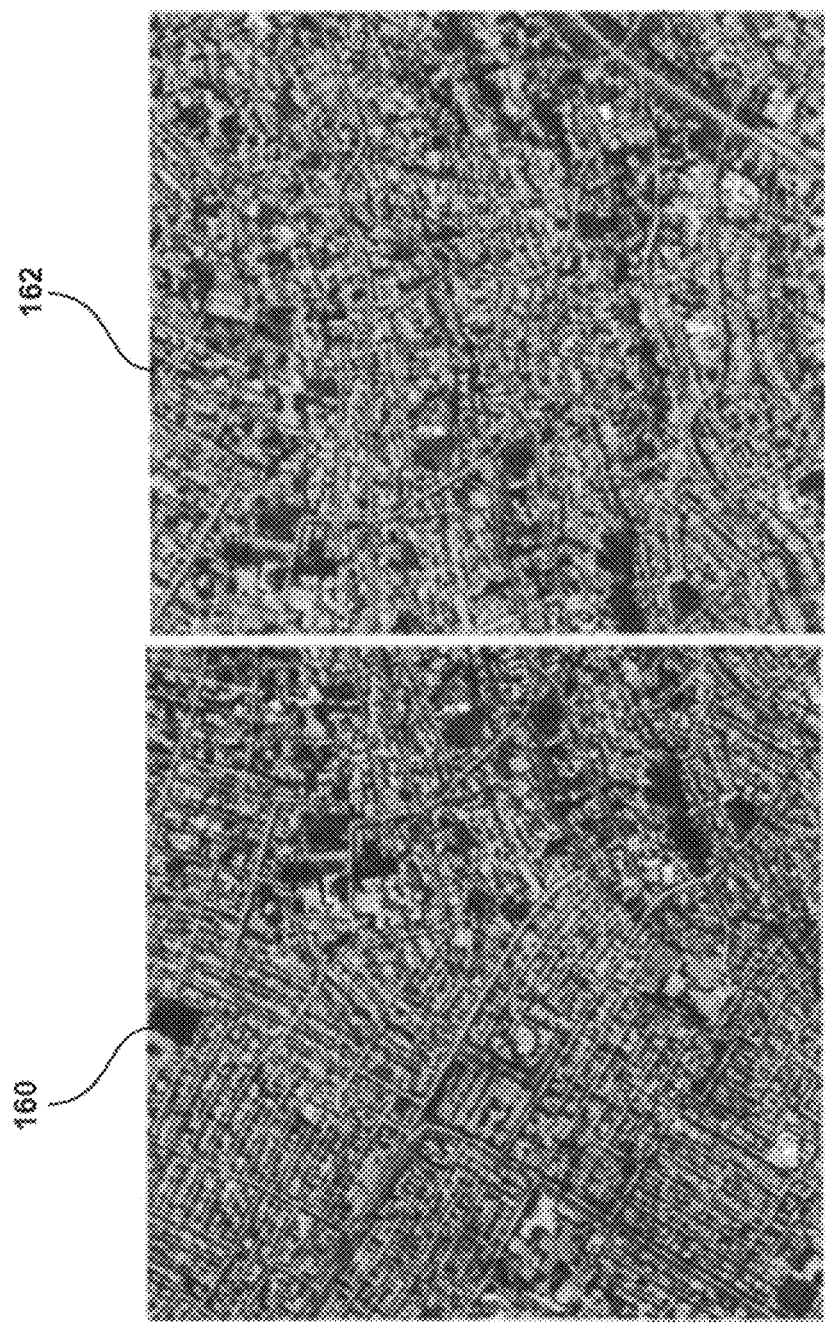
FIGS. 22A-22B illustrate a reference image and an unregistered image with negative rotation, according to an embodiment of the invention.
Figure 23:
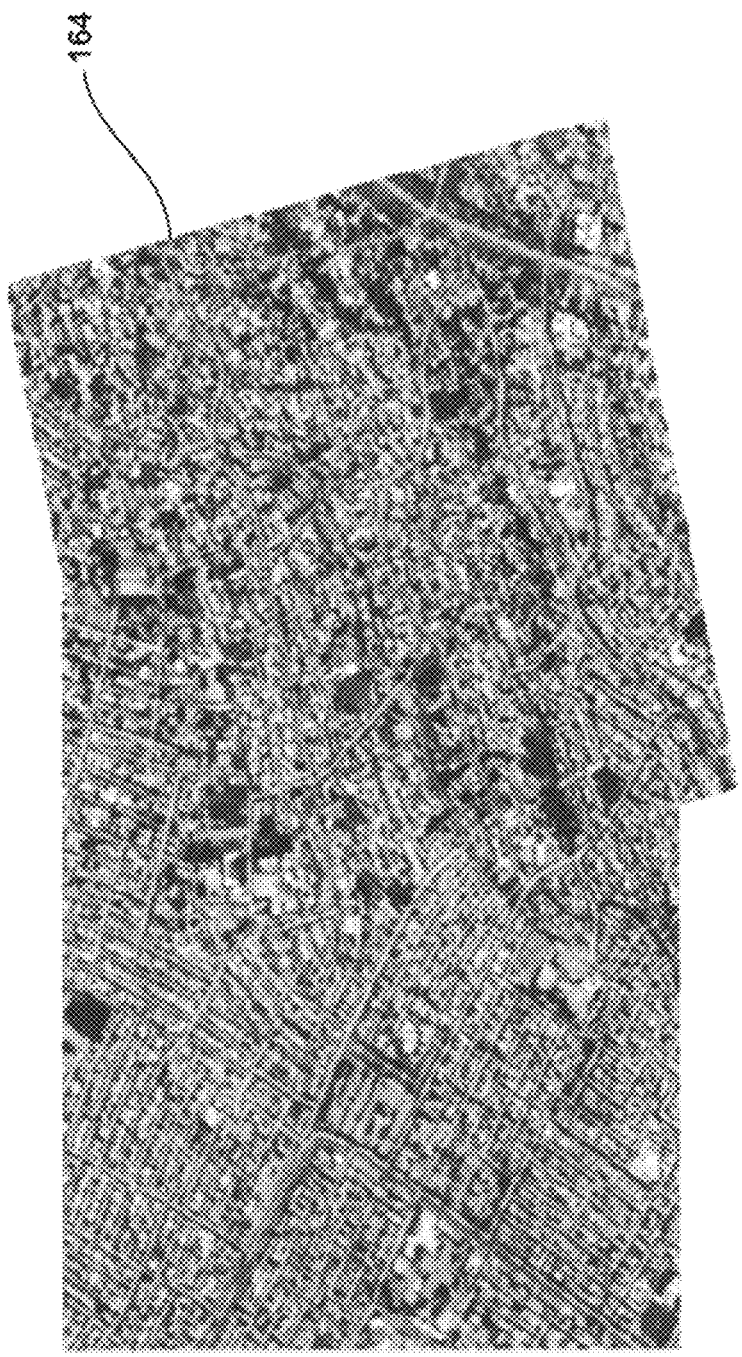
FIG. 23 illustrates the registration of the images of FIGS. 22A-22B, according to an embodiment of the invention.

The method and its multi-stage algorithm may be applied to images having both positive (counterclockwise) and negative (clockwise) rotations. FIGS. 22A-22B depict the reference 160 and unregistered 162 aerial images used as inputs to the algorithm in an exemplary embodiment. FIG. 22A depicts the reference image 160, and FIG. 22B depicts the unregistered image 162 with negative rotation, relative to the reference image 160. FIG. 23 depicts a registered image 164 as the output of the algorithm. The unregistered image 162 had to be rotated counter-clockwise to correct the orientation.

Figure 24A:
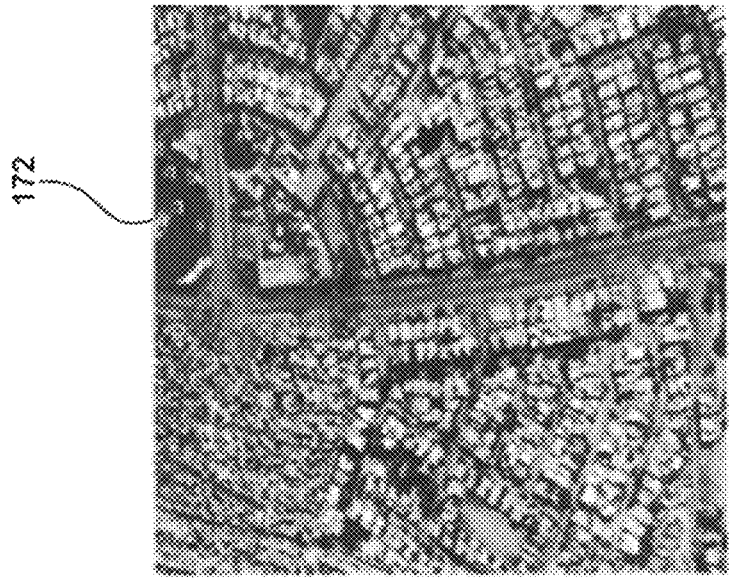
FIGS. 24A-24B illustrate a reference image and an unregistered image with positive rotation, according to an embodiment of the invention.
Figure 24B:
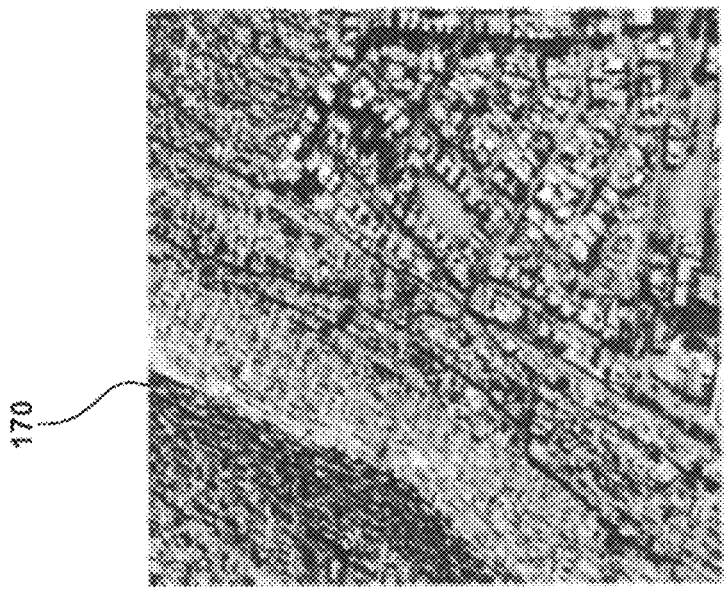
Figure 25A:
FIG. 25A illustrates the registration of the images of FIGS. 24A-24B, according to an embodiment of the invention.
Figure 26B:
FIGS. 26A-26B illustrate a reference image and an unregistered image, according to an embodiment of the invention.
Figure 26A:
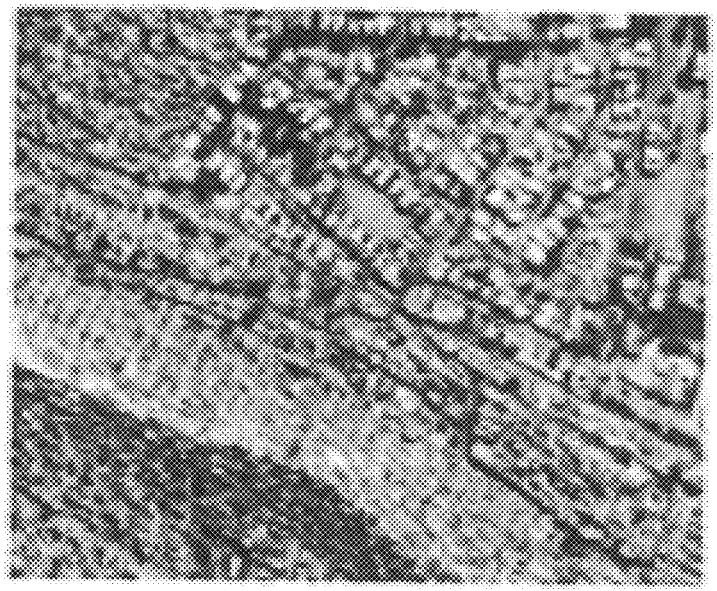
Figure 27:
FIG. 27 illustrates the registration of the images of FIGS. 26A-26B, according to an embodiment of the invention.
Figures 28A, 28B:
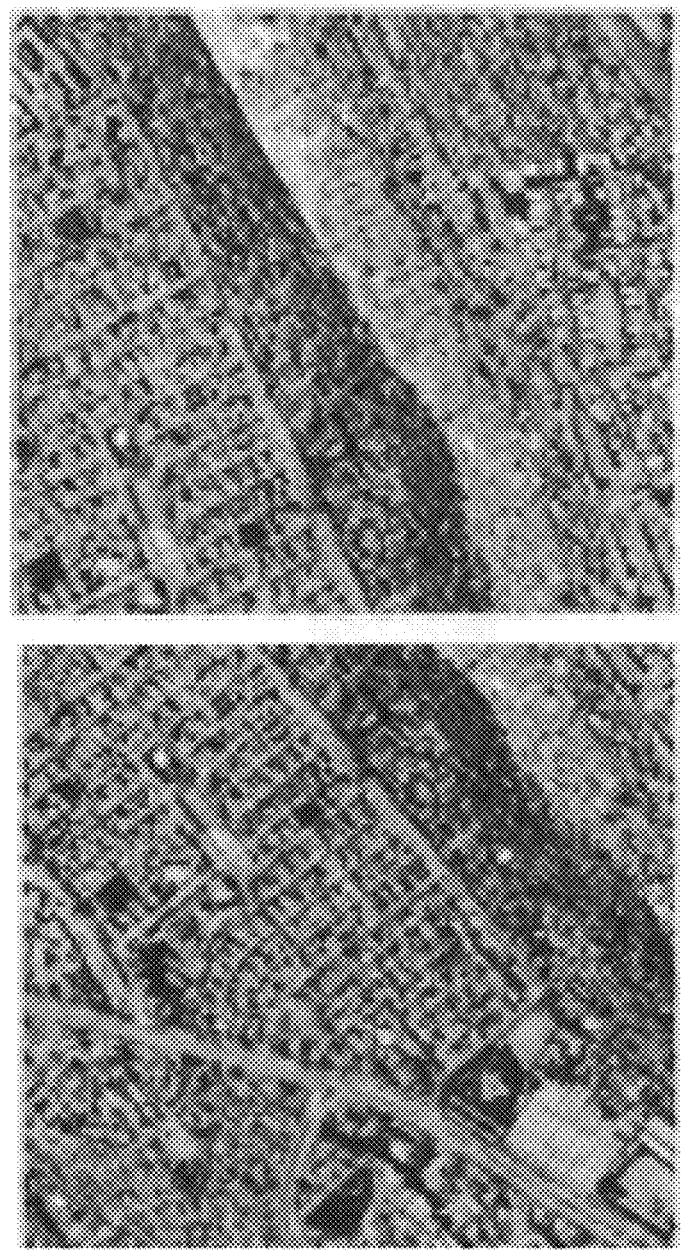
FIGS. 28A-28B illustrate a reference image and an unregistered image, according to an embodiment of the invention.
Figure 29A:
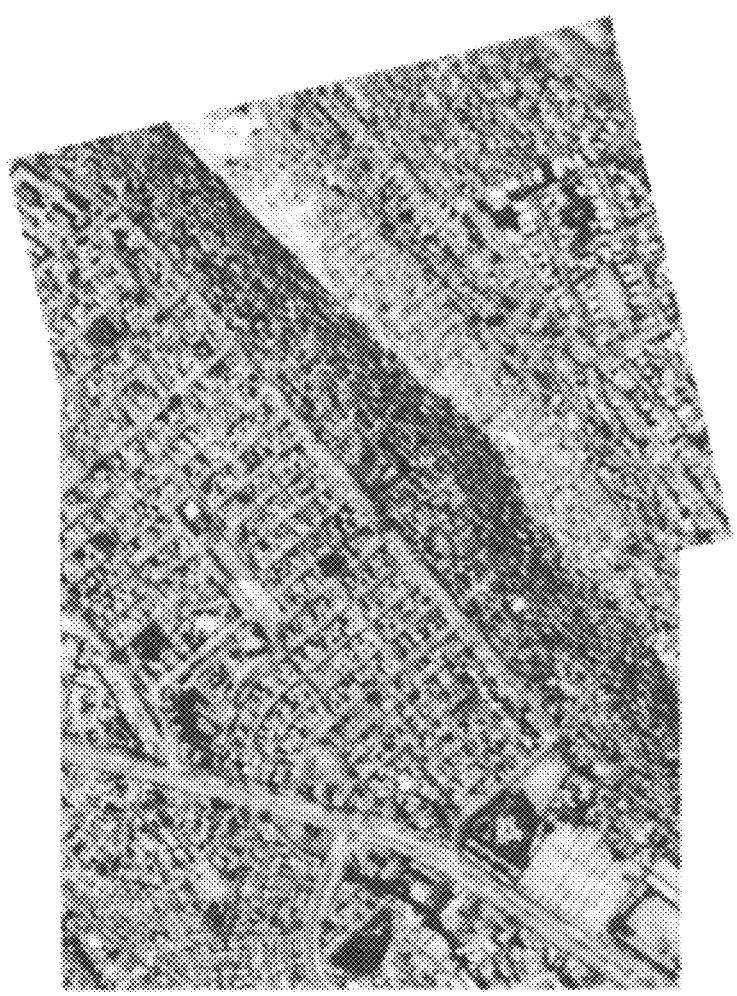
FIG. 29A illustrates the registration of the images of FIGS. 28A-28B, according to an embodiment of the invention.

FIG. 24A depicts reference 170 and unregistered 172 aerial images used as inputs to the algorithm. FIG. 25A depicts the registered image 174 as the output of the algorithm. The unregistered image 172 had to be rotated clockwise to correct the orientation.

The amount of rotation, the direction of rotation, and the overlap differed for both sets of reference and unregistered images in FIGS. 22A-25. However, one factor in the imagery is similar, which is that both sets of imagery contained very densely populated areas. The images at high altitude appeared as textured images and feature extraction alone would have not simplified registration or a pattern-recognition process.

System and environmental noise also decrease the statistical dependencies, and produces false positives in template matching. Traditional edge detectors may have produced delocalization, which can also hinder the registration process. The disclosed method was successful in overcoming these obstacles.

Although Cross Correlation is typically very computationally expensive, the disclosed algorithm provides a reduced search space for multiple template matching and estimation of image orientation, which makes the approach more viable and computationally cost effective. FIGS. 25B-25C present the processing time on an I-7 machine running windows 7 as the operating system.

For both image set 1 and set 2, corresponding to FIGS. 26A-29A, the computational times using the traditional NCC approach for template matching and the reduced search space of the disclosed method.

As mentioned in the previous section, the algorithm may be applied to images having either positive or negative rotation, producing successful registration. The processing time is dependent on the processor, operating system, and software optimizations. Processors capable of performing out of sequence calculations and software techniques to reduce delays will affect the processing times. Another factor that affects the processing time is the size of the input images i.e. the number of pixels in an image set. Image set 1 (FIGS. 26A, 26B, 27) is 441 rows by 400 columns which is a little larger than image set 2 (FIGS. 28A, 28B, 29A) where the image size is 426 rows by 364 columns. FIGS. 25B-25C show that the processing time for image set 1 is greater than the processing time for image set 2. However, the processing times for each are significantly shorter than the traditional method.

To illustrate computational times, FIGS. 29B-29C present the number of operations for both image set 1 and 2 using the traditional NCC approach and the reduced search space disclosed herein. The number of operations is defined as the number of pixel values to be determined for feature extraction, calculating NCC, and MI. This provides a measure of performance independent of software and hardware considerations. Similar to FIGS. 25B-25C, the total number of pixels in images in image sets 1 and 2, affect the number of operations performed for a template match. This can be observed in the total number of operations per template match for image sets 1 and 2.

FIGS. 30A-30B depict a multi/hyper-spectral reference image (FIG. 30A) and an unregistered image (FIG. 30B) overlapping the reference image with a noise level of 24 dB SNR (visible band). The bottom image (FIG. 30C) is a noisy (24 dB SNR) registered image using the disclosed method.

FIGS. 31A-31B depict a noisy multi-spectral/hyper-spectral reference image (FIG. 31A) and an unregistered (FIG. 31B) hyper-spectral/multi-spectral overlapping the reference image (Short Wave Infra-Red SWIR). The image orientation and translation parameters are calculated using the visible spectrum image from the hyper-spectral data cube, and then applied to the SWIR image to perform successful registration. The bottom image (FIG. 31C) is a registered image using the disclosed method.

Figure 32:
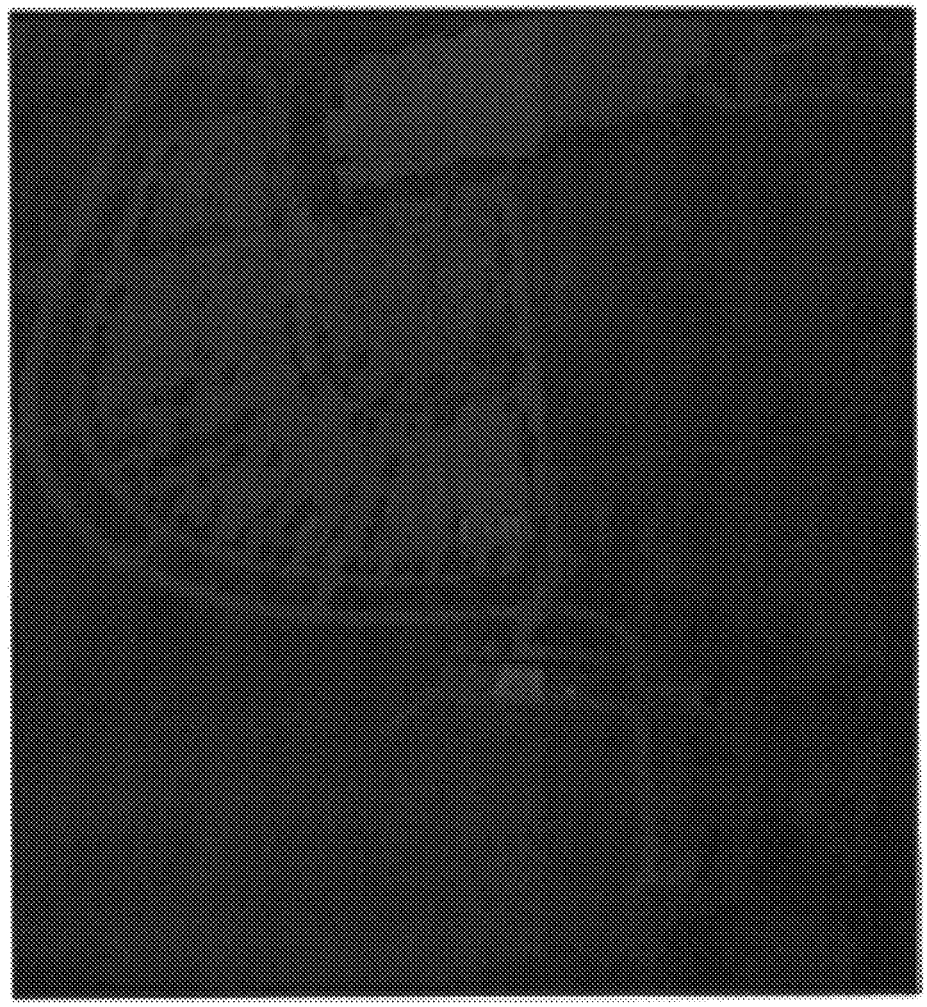
FIG. 32 illustrates the registration of a visible spectrum image with an SWIR spectrum image, according to an embodiment of the invention.
Figure 33:
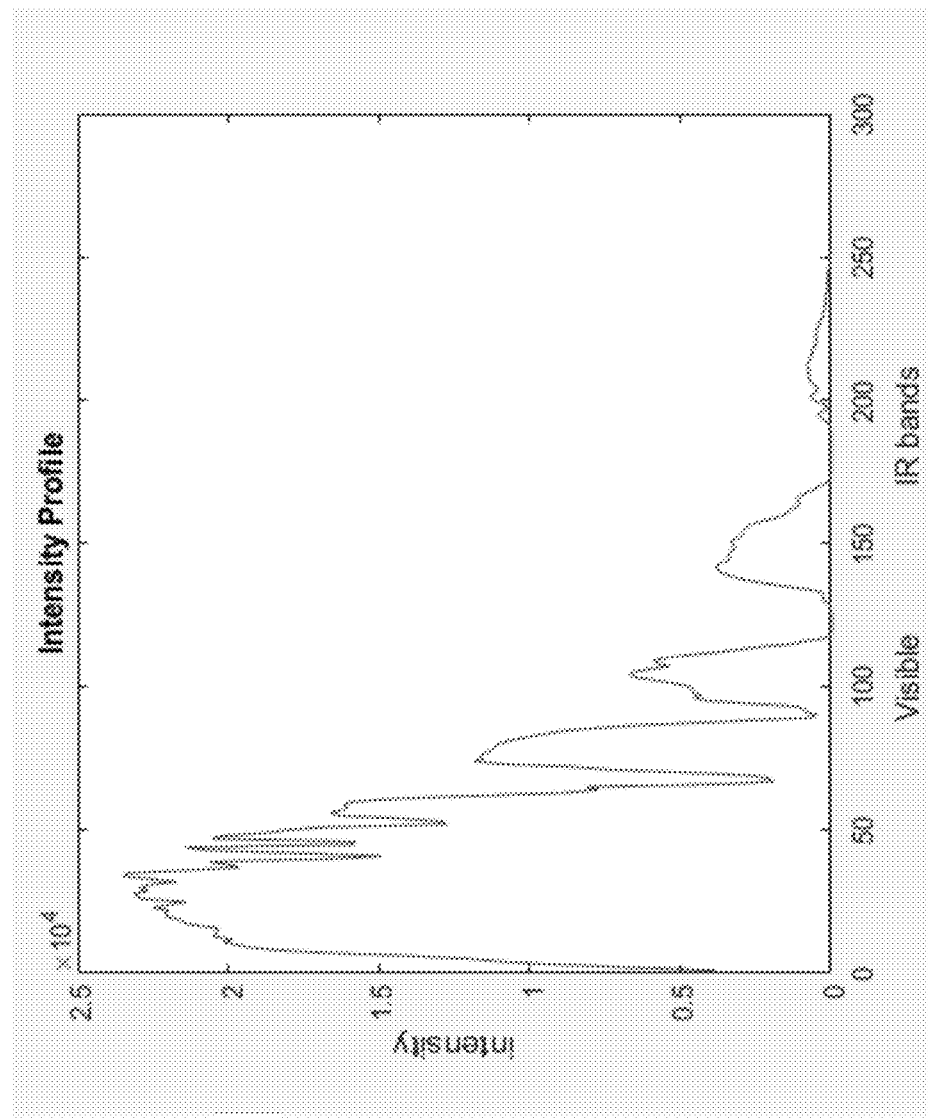
FIG. 33 depicts a hyper spectral/multi-spectral visible band image with an overlapping infra-red (IR) band image, where the difference in image intensities between the visible and IR is large, as can be seen from the intensity profile shown below.

FIGS. 32-33 depict the result of the disclosed method when registering a hyper spectral/multi-spectral visible band image with an overlapping infra-red (IR) band image, where the difference in image intensities between the visible and IR is large, 5-10 times depending on the detector as can be seen from the intensity profile shown in FIG. 33, (bands over 170 are IR bands) and the IR band image (on the right) appears very dark compared to the visible spectrum image. This illustrates the power of the disclosed method in its ability to successfully process overlapping images from different spectra.

Figure 34:
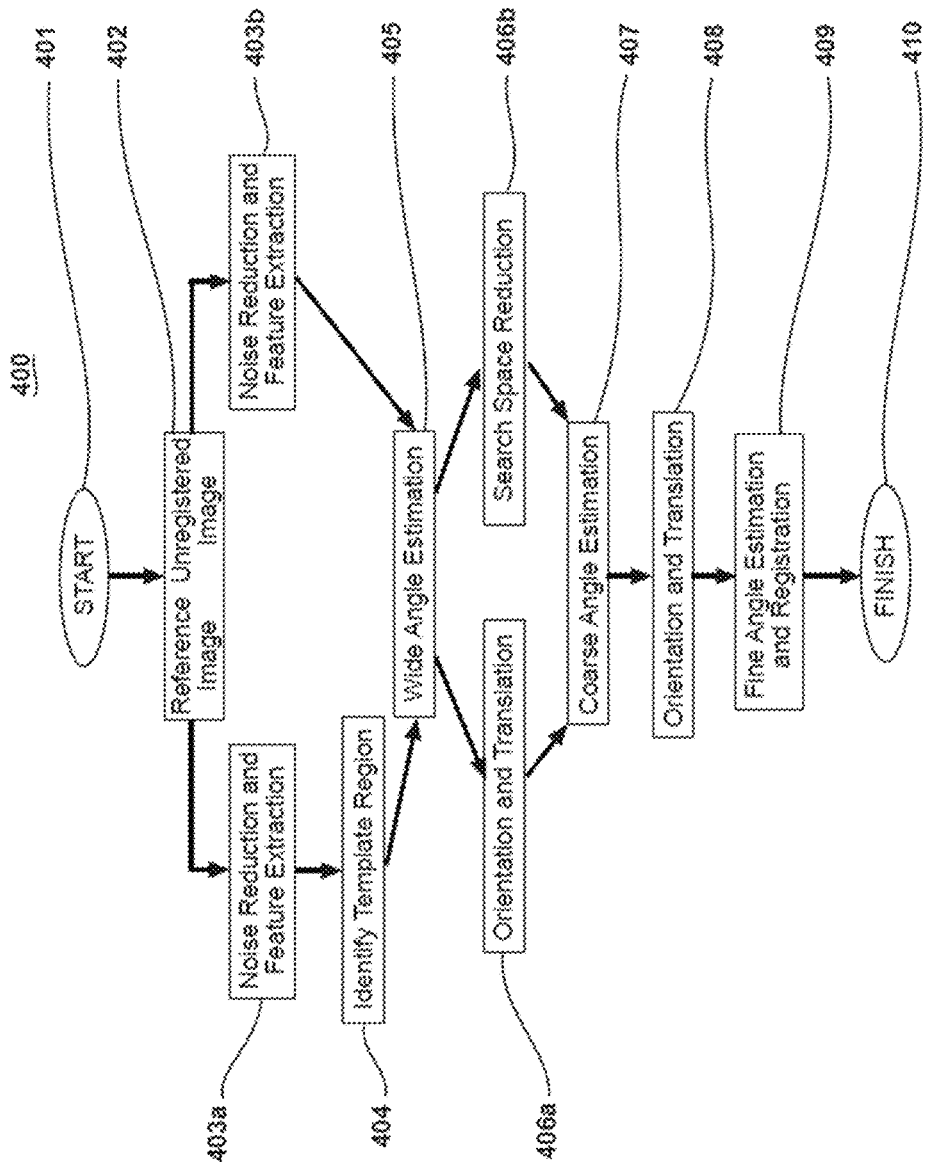
FIG. 34 is a flowchart of an exemplary embodiment of a method for registration of partially overlapped aerial imagery employing hybrid similarity measures and reduced search space, according to an embodiment of the invention.

FIG. 34 is a flowchart illustrating an exemplary embodiment of a method 400 employed to evaluate a registration algorithm for remote sensed imagery. One or more steps of the method shown in FIG. 34 may be fully or partially performed on practically any properly configured device, including a computer, computer system, or programmable device, e.g., multi-user or single-user computers, desktop computers, portable computers and devices, computers and computer systems aboard aircraft and other vehicles, handheld devices, network devices, mobile phones, etc., all of which will hereinafter be referred to simply as a "computer". Each computer may include a machine readable medium, as is known in the art.

The method begins (step 401) by accepting a reference image $\overrightarrow{I1_{MXN}}$ and an unregistered image $\overrightarrow{I2_{MXN}}$ (step 402). The images 140, 142 may be acquired in any spectra, from visible to infrared. For both $\overrightarrow{I1_{MXN}}$ and $\overrightarrow{I2_{MXN}}$, noise reduction and feature extraction (two-dimensional convolution) is performed (steps 403a and 403b), typically using the cubic spline wavelet for noise reduction and edge detection while maintaining grey level intensities. Next, a template region is identified or assigned (step 404) in a valid template region of the reference image 140. A wide angle range is assigned (step 405) between $-\theta R$, and $\theta R$, with angular space of $\theta n=\theta n-1+\alpha$, where $\alpha$ is a constant dependent on angle of rotation, such that the interval $2\theta R$ is an integer multiple of $\alpha$. Next, template matching is executed using Normalized Cross Correlation (FIG. 21, steps 302-304, which steps are also repeated as a part of step 310) as a similarity measure. The maximum NCC value is saved, along with the corresponding orientation and translation parameters. This process may be repeated for all templates in the valid template region of the reference image 140 and find corresponding matches in the unregistered image 142, i.e. for each template in the reference image, a matched template will be determined in the unregistered image. Step 405 may be repeated, i.e. step 302 within step 405 will be repeated for all wide angular values, to determine $\gamma(i,j)$ for all wide angular values in the angle range for the unregistered image 142. The maximum value across all orientations provides possible wide angle $\theta_{WA}$ estimation and translation parameters (step 406a). Based on the image height or rows in an image the margin for maximum image overlap is then calculated (Step 406b). Steps 406a-406b are not performed in parallel; while search space reduction is independent of image translation, it is dependent on the angle determined in the wide angle stage. The wide angle overlap plus the margin provides the reduced search space for the next stage.

The coarse angle estimation process begins (step 407) after the parameters are determined from the wide angle estimation (steps 406a-406b). The unregistered image orientation is set at the values provided by the previous stage for coarse angle calculation with $\theta_{WA}-(\alpha-1)$ as the starting point to $\theta_{WA}+(\alpha-1)$ as the final orientation. Normalized cross correlation is then applied as a similarity measure along with variation of information (step 408) to determine the coarse angle $\theta CA$ for orientation and the translation parameters.

The final stage of the algorithm begins (step 409) by setting the unregistered image orientation at the values provided by the previous stage for fine angle calculation with ($\theta_{CA}-0.9$) as the starting point to ($\theta_{CA}+0.9$) as the final orientation. This is the angle space remaining after the coarse angle stage for the best match for image rotation angle. Once again the normalized cross correlation is applied as a similarity measure along with variation of information to determine the angle $\theta$ for orientation and the final translation parameters to complete the registration process (step 410).

FIG. 34 is a flowchart 500 illustrating an exemplary embodiment of a method for multivariate analysis of algorithmic performance in the presence of system uncertainty in aerial imagery that was used to evaluate the performance of this algorithm. Operationally, one of the challenging factors that affect algorithmic applications is sensor system uncertainty or system noise. Although there are multiple sources of noise in an imaging system, this effort models three noise sources: sensor noise, quantization noise, and impulsive or salt-and-pepper noise. In particular, the system noise is modelled and injected into the imagery to calculate/derive the signal to noise ratio (SNR) and to evaluate the algorithmic performance of the presented multi-stage method as a function of SNR.

The method begins (Step 401) by accepting a reference image (I1) $\rightarrow$M×N and an unregistered image (I2) $\rightarrow$M×N (step 402) acquired in any part of a spectra from visible to Infrared. For both (I1) $\rightarrow$M×N and (I2) $\rightarrow$M×N, two-dimensional convolution is performed (Steps 403a and 403b) using the cubic spline wavelet for noise reduction and edge detection while maintaining grey level intensities. A template is assigned (step 404) in the valid template region of the reference image. A wide angle range is assigned (step 405) between $-\theta R$, and $\theta R$, with angular space of $\theta n=\theta n-1+\alpha$, here $\alpha$ is a constant dependent on angle of rotation, such that the interval $2\theta R$ is an integer multiple of $\alpha$. Template-matching is executed using Normalized Cross Correlation as a similarity measure. The maximum NCC value is saved, along with the corresponding orientation and translation parameters. This process is repeated for all templates in the valid template region of the reference image and corresponding matches are found in the unregistered image. Step 405 is repeated to determine $\gamma(i,j)$ for all wide angular values in the angle range for the unregistered image. The maximum value across all orientations provides possible wide angle $\theta_{WA}$ estimation and translation parameters (step 406a). Based on the image height or rows in an image the margin for maximum image overlap is then calculated (step 406b). The wide angle overlap plus the margin provides the reduced search space for the next stage.

The coarse angle estimation process begins (step 407) after the parameters are determined from the wide angle estimation (steps 406a and 406b). The unregistered image orientation is set at the values provided by the previous stage for coarse angle calculation with $\theta_{WA}-(\alpha-1)$ as the starting point to $\theta_{WA}+(\alpha-1)$ as the final orientation. Normalized cross correlation is then applied as a similarity measure along with variation of information (step 408) to determine the coarse angle $\theta CA$ for orientation and the translation parameters.

The final stage of the algorithm begins (step 409) by setting the unregistered image orientation at the values provided by the previous stage for fine angle calculation with ($\theta CA-0.9$) as the starting point to ($\theta CA+0.9$) as the final orientation. Once again, the normalized cross correlation is applied as a similarity measure along with variation of information to determine the angle $\theta$ for orientation and the final translation parameters to complete the registration process (step 410).

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for registration of partially-overlapped images, comprising:
   performing noise reduction and feature extraction in a reference image and an unregistered image;
   determining a template size using a phase transition methodology for a sufficiently-sampled finite data set, wherein the phase transition methodology comprises calculating the maximum possible entropic states and actual entropic states as number of the pixels;
   identifying a template region in the reference image;
   performing a wide angle estimation of the reference image and the unregistered image;
   performing orientation and translation of the reference image and the unregistered image;
   applying margin, imtrim, and overlap to reduce a search space of the reference image and the unregistered image;
   performing a coarse angle estimation of the reference image and the unregistered image;
   performing orientation of the reference image and the unregistered image of the coarse angle estimation; and
   performing a fine angle estimation and registration of the reference image and the unregistered image.

2. The method for registration of partially-overlapped images of claim 1, wherein the step of determining a template size using a phase approach for a sufficiently-sampled data set further comprises:
   calculating the maximum possible entropic states and actual entropic states as a number of intensities present in the pixels of a given reference and unregistered image.

3. The method for registration of partially-overlapped images of claim 1, wherein the step of determining a template size using a phase approach for a sufficiently-sampled data set further comprises:
   determining template size with an m×m template, where m is a power of 2; wherein the total number of pixels M=m×m is equal to or greater than the number of pixels identified by the phase transition methodology.

4. The method for registration of partially-overlapped images of claim 1, wherein the step of performing a coarse angle estimation of the reference image and the unregistered image further comprises:
   performing sequential normalized cross-correlation in the reduced search space.

5. The method for registration of partially-overlapped images of claim 4, wherein the step of performing a coarse angle estimation of the reference image and the unregistered image further comprises:
   performing a mutual information-based variation of information.

6. The method for registration of partially-overlapped images of claim 1, wherein the step of performing a fine angle estimation of the reference image and the unregistered image further comprises:
   performing sequential normalized cross-correlation in the reduced search space.

7. The method for registration of partially-overlapped images of claim 4, wherein the step of performing a fine angle estimation of the reference image and the unregistered image further comprises:
   performing a mutual information-based variation of information.

* * * * *